US008554386B2

(12) United States Patent
Rutman

(10) Patent No.: US 8,554,386 B2
(45) Date of Patent: Oct. 8, 2013

(54) SYSTEM AND METHOD FOR SELF-POWERED COMMUNICATIONS NETWORKS

(76) Inventor: Serge Rutman, Boulder Creek, CA (US)

( * ) Notice: Subject to any disclaimer, the term of this patent is extended or adjusted under 35 U.S.C. 154(b) by 136 days.

(21) Appl. No.: 13/152,230

(22) Filed: Jun. 2, 2011

(65) Prior Publication Data

US 2011/0301770 A1 Dec. 8, 2011

Related U.S. Application Data

(60) Provisional application No. 61/350,807, filed on Jun. 2, 2010.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G05D 1/00* | (2006.01) |
| *G06F 7/00* | (2006.01) |
| *G06F 17/00* | (2006.01) |
| *G06F 19/00* | (2011.01) |
| *G06F 11/30* | (2006.01) |
| *G01M 17/00* | (2006.01) |
| *G01R 21/06* | (2006.01) |
| *G21C 17/00* | (2006.01) |
| *G01R 11/56* | (2006.01) |
| *G01R 21/133* | (2006.01) |
| *G06F 15/16* | (2006.01) |
| *G08B 1/08* | (2006.01) |
| *G08B 23/00* | (2006.01) |
| *H04Q 1/30* | (2006.01) |

(52) U.S. Cl.
USPC .............. 700/292; 700/287; 701/2; 701/31.5; 701/32.4; 702/62; 702/184; 705/412; 709/203; 340/532; 340/539.24; 340/539.25; 340/539.28; 340/693.2

(58) Field of Classification Search
USPC .......... 700/286, 287, 292, 295, 296; 701/1, 2, 701/19, 21, 22, 29.1, 31.4, 31.5, 32.3, 32.4, 701/32.6, 99–101; 702/57, 60–62, 702/182–184; 705/400, 412; 709/201, 203, 709/217–219; 340/500, 501, 517, 531, 532, 340/539.1, 539.16, 539.17, 539.22, 539.24, 340/539.25, 539.26, 539.28, 540, 635, 340/693.1, 693.2, 693.3, 693.5, 870.01, 340/870.02, 901, 905, 988, 989
See application file for complete search history.

(56) References Cited

U.S. PATENT DOCUMENTS

| 7,495,351 | B2 * | 2/2009 | Fein et al. ...................... 290/1 R |
| 7,608,934 | B1 * | 10/2009 | Hunter ........................... 290/4 R |
| 7,657,406 | B2 * | 2/2010 | Tolone et al. ...................... 703/2 |

OTHER PUBLICATIONS

Hart, Anna, "Solar Energy—Portable Power Station Convenience", http://www.solar-energy-connection.com/solar-generators/solar-energy-portable-power-station-convenience-30/, May 21, 2007.
"AN/TSQ-190 Trojan/Trojan Spirit II", http://www.globalsecurity.org/intell/systems/trojan.htm, Mar. 7, 2003.
"SkyStation Containerized Power Systems, The Original Mobile Power Station", http://www.skybuilt.com/products/products_skystation.htm, Jun. 2, 2009.

* cited by examiner

*Primary Examiner* — Crystal J Barnes-Bullock
(74) *Attorney, Agent, or Firm* — Sheppard, Mullin, Richter & Hampton LLP

(57) ABSTRACT

Techniques for providing localized power infrastructure and data infrastructure are disclosed. A transportable system for providing localized power infrastructure and data infrastructure can include: a data network service engine configured to function as a local data network service provider; a power generation engine configured to function as a local power service provider that generates and distributes power locally; a deployment engine configured to assist in deploying one or more components of the transportable system; and a maintenance engine configured to maintain operation and security of the transportable system. In some embodiments, multiple transportable systems can be deployed and then centrally monitored or controlled as a single, utility system and/or a single data delivery infrastructure.

32 Claims, 10 Drawing Sheets

SYSTEM AND METHOD FOR SELF-POWERED COMMUNICATIONS NETWORKS

CROSS-REFERENCE TO RELATED APPLICATION

This application claims priority from U.S. Provisional patent application Ser. No. 61/350,807, entitled "Self-Powered Communication Network," filed Jun. 2, 2010, which is incorporated by reference.

DESCRIPTION OF THE RELATED ART

In some areas of the world, there is an absence of power infrastructure (e.g., electric/power grids, power plants), communications infrastructure (e.g., Public Switched Telephone Network (PSTN), Digital Subscriber Line (DSL), Internet connectivity via cable), or both. Areas usually lacking such infrastructure include sparsely populated regions of the world, geographically remote locations of the world, and many regions of third world countries. Of those parts of the world that have the benefit of power and communications infrastructure, such infrastructure may come at a high cost to its customers, or may not be as reliable as the power and communications services afforded to other, more developed areas of the world (e.g., metropolitan areas). Utility outages (e.g., power, telephone, data network service) in areas such as third world countries are a common occurrence.

Several factors can be attributed to the lack or unreliability of power and communications infrastructure. One factor causing unreliability is the general, worldwide increase in demand for utility services. Increases in electricity demand are well known to result in rolling blackouts in order to keep up with consumer demand. Other factors that can be attributed to the lack or unreliability of power and communications infrastructure include the breakdown of a stressed and aging infrastructure and the reluctance of utility companies (e.g., power companies, telecommunication companies) to invest in infrastructure or infrastructure upgrades in areas having little to no return on investment (e.g., high speed data network connections in rural areas).

Also troubling is the cost and waste associated with traditional forms of power and communications infrastructure. For example, with respect to traditional power infrastructure, power plants are typically located remotely with respect to the customers they serve and, as such, must utilize transmission lines to deliver electricity to its customers.

FIG. 1 provides a diagram illustrating an example use of traditional power infrastructure. As shown, the traditional power infrastructure distributes power by generating power at a power plant 15 and delivering power through a power (distribution) grid 25. Power plant 15 is connected to power distribution grid 25 and power distribution grid 25, in turn, connects to a dwelling 45 through wires 65 to a meter 30 at dwelling 45. From meter 30, power is distributed throughout dwelling 45. The connections in the power grid 25 include continuous wired connections (with power substation 10), that extend from the power plant 15 to dwelling 45.

Electricity typically travels long distances over a power grid before it reaches its intended users. The further the electricity has to travel to reach its intended users, the greater the power loss. Such loss is correlated with wasted fuel used to generate the electricity and unnecessary pollution produced during power generation.

With respect to traditional communications infrastructure, communications devices traditionally used by consumers (e.g., cordless phones, answering machines, wireless routers) are powered either by the local grid of the power infrastructure (e.g., by a power service provider) or by batteries. FIG. 2 is a diagram illustrating the former of the two configurations. Specifically, FIG. 2 illustrates an example use of a traditional communications infrastructure in conjunction with a traditional power infrastructure. In FIG. 2, a wire-connected, Plain Old Telephone Service (POTS) is provided to a dwelling 45. As well known in the art, the POTS network can generate and distribute power required by a basic user telephone 40 over the same lines used to carry the voice channel. Generally, the power to the POTS network is provided by way of a power grid connection 80 to a local switching station 10; typically, power grid connection 80 supplies power from a power plant 15 to the switching station 10, which then gets transmitted to user telephone 40. As backup power, the local switching station 10 can also be equipped with an uninterruptible power supply or emergency generator 20 located near the station 10, thereby ensuring the POTS network remains in service even in the case of a power grid outage.

Functionally, the switching station 10 routes telephone calls (e.g., voice packets) received from a communications network service provider 16 (via connection 50) to a wire pair 60 connected to the user telephone 40. As noted above, the same wires 60 also deliver power from the switching station 10 to the user telephone 40; this power is mainly intended to power telephones that provide "basic service" telephony service.

For additional telephony devices (e.g., answering machines, cordless phones), a non-communications network based power supply must be utilized (e.g., power provided through a local grid maintained by a power service provider, or generator located at user site). Power needed at a user site (e.g., dwelling 45) to drive equipment other than just a basic telephone (such as telephony devices, appliances, and computers) typically must be purchased from third parties (e.g., power company, battery supplier) when not generated locally at the user site.

For instance, as shown in the diagram of FIG. 3, which illustrates equipment and respective power sources, equipment may fall into two categories: battery powered devices 301, and electric grid powered devices 303. Examples of battery-powered devices include portable radios 328, cellular telephones 331, and laptop computers 337. These devices rely on battery manufacturers 306 to provide rechargeable and non-rechargeable batteries as power sources, with the rechargeable batteries usually requiring an electric grid for recharge. As such, consumers of battery-operate devices either directly or indirectly pay battery manufacturers to power their devices. Examples of electric grid-powered devices, on the other hand, include cordless telephone base stations 340, kitchen appliances 343, lights fixtures 346, battery chargers 349, satellite modems 352, and cable television receivers/modems 355. Electric-grid powered devices such as these rely on a power service provider 309 to supply them with electricity (i.e., power) over an electric grid.

As also shown in FIG. 3, certain devices also depend on communications service providers to operate as intended. Namely, satellites modems 352 depend on a satellite data service provider 322, cable television receiver/modems 355 depend on a cable television service provider 325, and cordless telephone base stations 340 depend on telephone companies or Voice-over-IP (VoIP) service providers 312 in order to operate and communicate data. Likewise, portable radios 328 depend on radio stations 316 for data, while cellular telephones 331 depend on cellular/wireless phone carriers 319 in order to receive wireless data service. Other than the POTS provided by telephone companies, none of these providers supply the power needed to utilize the their services, leaving the consumer to rely on a power service provider.

It would beneficial to have a system configured to be transported and deployed at locations (often remote locations) in need of reliable power or data infrastructure, and configured to provide such infrastructure on a localized basis with or without the use of existing infrastructure.

SUMMARY

Techniques for providing localized power infrastructure and data infrastructure are disclosed. Some of the following advantages can be achieved using techniques described in this paper: (a) reaching utility customers regardless of whether utility company infrastructure (e.g., power carrying wires of a power company) can economically reach them; (b) reducing costs of providing power to a dwelling (e.g., house) not yet connected to the power grid; (c) generating power locally, thereby avoiding power service interruptions due to outages, whether attributed to damaged power transmission lines or power demand exceeding supply available on a power grid; (d) providing a data network connection locally, thereby avoiding data communications service interruptions due to data network outages or power outages, whether attributed to damaged power or communication lines, or to excess power or data network demand; (e) obviating the need for utility customers to maintain multiple commercial relationships to obtain power and data network connectivity; (f) assisting utility customers in meeting their clean energy generation mix requirements or goals; (g) expanding power and data infrastructure to geographic territories that do not have a "shared grid" wired distributions system; (h) fostering competition and enabling market competition in a local geographic area having deployed embodiments; (i) allowing for deployment in small increments, thereby avoiding massive capital outlays or years of environmental impact and zoning negotiations; and (j) providing more reliable power and data infrastructure in areas having weak power or data infrastructure or low development density.

A transportable system for providing localized power infrastructure and data infrastructure can include: a data network service engine configured to function as a local data network service provider; a power generation engine configured to function as a local power service provider that generates and distributes power locally; a deployment engine configured to assist in deploying one or more components of the transportable system; and a maintenance engine configured to maintain operation and security of the transportable system. In some implementations, the deployment engine is an optional component.

In one embodiment, the transportable system comprises a maintenance engine configured to maintain operation and security of the transportable system by: monitoring an internal operational condition and an external operational environment of the transportable system; using data from the monitoring to determine whether the data network service engine and power generation engine are operating according to an operational parameter and within a damage risk threshold; and based on the determination, controlling the data network service engine, the power generation engine, or the deployment engine to ensure that the data network service engine and the power generation engine continue to operate according to the operational parameter and within the damage risk threshold.

Depending on the embodiment, the transportable system may be embedded in, or configured to be transported by, a motorized vehicle, a trailer, a train, or an aircraft. For example, the transportable system may be embedded into a recreational vehicle, implemented on a trailer, or implemented as a module that can be unloaded from a vehicle, trailer, train (e.g., cart), or airplane cargo hold and then deployed.

In some embodiments, the internal operational condition or the external operational environment may be collected by sensors disposed on or within the transportable system or various components thereof. In further embodiments, the external operational environment may be collected from an external data source that provides environment information for the transportable system's current geographic position. For example, the transportable system may obtain weather and climate information from an Internet weather service (e.g., via the data network service engine) that provides weather and climate information for the transportable system's current position.

Depending on the embodiment, the operational parameter may be a variable providing a value that specifies, defines, or limits an operation of the transportable system. For example, an operational parameter may define a minimum power generation requirement for a solar panel or a wind turbine of the transportable system's power generation engine. If and when the solar panel or the wind turbine ceases to generate the minimum power required in accordance with the operational parameter (e.g., the solar panel or wind turbine cease to provide 6.6 Kwh), the transportable system may determine an adjustment to the transportable system or a component of the transportable system is required in order for the transportable system to meet the minimum power generation requirement of the operational parameter (e.g., moving or repositioning the transportable system, or the solar panel so that the solar panel can receive more sun light, moving/repositioning the transportable system, or the wind turbine so that the wind turbine can capture more wind). Accordingly, in some embodiments, the deployment engine of the transportable system comprises a positioning engine configured to reposition the transportable system or a component of the transportable system (e.g., solar panel or wind turbine) when the maintenance engine determines that the transportable system or the component needs to track the sun in order for the power generation engine to operate according to the operational parameter.

Further, depending on the embodiment, the damage risk threshold may be a quantified level of risk of danger to the transportable system or a component thereof, at or after which the risk to the transportable system or the component is unacceptable without a change to the transportable system. In some embodiments, this determination is made by the transportable system or the component when the monitored data meets or exceeds the danger risk threshold described herein. For example, the transportable system or a component thereof may determine, from data relating to an internal operation condition or an external operational environment of the transportable system, that the weather conditions around the transportable system are sufficiently adverse to warrant an adjustment to the entire transportable system or to a component thereof to protect the same from damage (e.g., retract a deployed component of the transportable system; or cease an operation of the transportable system). For instance, the transportable system or a component thereof may determine, from an internal operation condition or an external operational environment, that the wind conditions around the transportable system exceed a danger risk threshold (e.g., wind danger risk threshold) for the transportable system when a component of the transportable is deployed (e.g., mast comprising an antenna, satellite, a security camera, a motion detector, or a flood light). In another example, if maintenance engine determines that there currently is or will be snow or hail conditions, the maintenance engine may deploy an umbrella over the solar panels to protect them some such snow or hail.

Additionally, with respect to weather and climate, certain embodiments may obtain and utilize information (from an external data source, such as an Internet weather service) that predicts what the weather and climate at the transportable system's current location will be in the coming future. Based on such information, such embodiments can anticipate future weather conditions that would be dangerous to the transportable system (or component thereof) and, before the conditions onset, take appropriate precautionary actions (e.g., retract a deployed component of the transportable system; or cease a particular operation of the transportable system).

In another embodiment, the transportable system comprises a deployment engine configured to assist in deploying one or more components of the transportable system, where the deployment engine comprises a positioning engine configured to reposition the transportable system or a component of the transportable system. For example, depending on the embodiment, the positioning engine may reposition the transportable system or a component thereof when the maintenance engine determines from an external operational environment that a current position of the transportable system or the component exceeds a damage risk threshold. In further embodiments, the repositioning embodiment may reposition the transportable system or the component thereof when the maintenance engine determines that the transportable system or the component needs to track the sun or wind in order for the power generation engine to operate according to an operational parameter, as described herein.

In some embodiments, the deployment engine is configured to assist in repositioning one or more components from the transportable system to a location adjacent to the transportable system for deployment. For example, in particular embodiments, the deployment engine of the transportable system comprises a hydraulic, electrical, or pneumatic assist device adapted to move or deploy a component of the transportable system.

With respect to providing localized data infrastructure, in various embodiments, the data network service engine comprises a long-range satellite dish, a long-range antenna or a hardware interface, wherein the long-range satellite or the long-range antenna is configured to connect the data network service engine to a wireless data connection service, provided by a third party data service provider, through a wireless connection, and wherein the hardware interface is adapted to connect the data network service engine to a data connection service provided, by the third party data service provider, through a wired connection.

In order to provide a local data connection service (e.g., local Internet service to clients around the transportable system), various embodiments include a data network service engine that comprises a short-range antenna, a medium-range antenna, or a hardware interface, wherein the short-range antenna or medium-range antenna is adapted to provide a local data connection service through a wireless connection, and wherein the hardware interface is adapted to provide a local data connection service through a wired connection.

With respect to providing localized power infrastructure, in various embodiments, the power generation engine may comprise a generator, a solar panel, a wind turbine, a water turbine, a fuel cell, a fuel tank, or a battery. Depending on the embodiment, the power generation engine may be configured to concurrently use a combination of these and other power sources. For example, the power generation engine may utilize a fuel cell concurrently with a wind turbine to generate power, or utilize a fuel cell concurrently with a solar panel.

Certain embodiments may be configured to utilize an external power grid, operated by a third party, concurrently with a power source of the power generation engine when providing generating and distributing power locally. By doing so, some such embodiments, can augment or replace the power provided by the external power grid the power generated by the power generation engine when necessary. For instance, in some embodiments, the maintenance engine of the transportable system is configured to detect intermittent power shortfalls on the external power grid operated by a third party power service provider, and control the power generation engine in order to compensate for the intermittent power shortfalls. Effectively, such embodiments can buffer power recipients/users from power outages or reductions.

In additional embodiments, the power generation engine is configured to provide surplus power to an external power grid operated by a third party power service provider. For instance, when the power generation engine of the transportable system is generating more power than is being used by the local recipients/users it is serving, the power generation engine can output/transmit the extra power on to the external power grid for use by others. In doing so, the operator could sell the surplus power generated by the transportable system to the third party operating the external power grid.

With respect to maintenance, safety, and security of the transportable system, in some embodiments, the maintenance engine is further configured to allow a systems operator to remotely monitor the internal operational condition and the external operational environment, and remotely operate and secure the transportable system or a component of the transportable system. For example, a systems operator may remotely monitor, operate and secure the transportable system using an Internet data connection established through the data network service engine. Depending on the embodiment, the maintenance engine ma comprises a camera, a sensor, a clearing device, a cooling device, a fire suppressant system, an insect or animal repellant, or lighting that assist in maintenance of the transportable system or a component of the transportable system.

In order to detect errors in the transportable system, for some embodiments, the maintenance engine is further configured to detect, from the internal operational condition or the external operational environment, an error in the data network service engine, the power generation engine, or the deployment engine, and alert a systems operator of the error. In other embodiments, the maintenance engine is capable of determining from the internal operational condition or the external operational environment that a current operation of the transportable system or a component thereof exceeds the damage risk threshold, and in response, alerting a systems operation of the excess. As described herein, the maintenance engine may also attempt to remedy an error detected in the transportable system or component thereof, or to adjust the transportable system or a component thereof to mitigate or eliminate a risk of damage.

In additional embodiments, the transportable system further comprises: a first transportable module comprising the maintenance engine, the data network service engine, the power generation engine, and the deployment engine; a second transportable module comprising a second maintenance engine, a second data network service engine, a second power generation engine, and a second deployment engine; an interconnect module that interconnects the first transportable module to the second transportable module; and wherein the first transportable module uses the second maintenance engine to augment or redundantly support the maintenance engine, the first transportable module uses the second data network service engine to augment or redundantly support the data network service engine, the first transportable module uses the second power generation engine to augment or redundantly support the power generation engine, or the first transportable module uses the second deployment engine to augment or redundantly support the deployment engine. By using two modules (i.e., a first transportable module and a second transportable module), certain embodiments can provide redundancy in the even that one of the modules partially or completely fails. For example, when the power generation engine of the first transportable module fails, the second power generation engine of the second transportable module can take over the failed engine's load, usually transparently. In another example, when the data network service engine of the first transportable module fails, the second data network service engine of the second transportable module can take over the failed engine's bandwidth, usually transparently.

Using two modules also allows some embodiments to combine the efforts of the two modules when generating and distributing power locally, and when providing local data network service. For example, the power output of the power generation engine of the first transportable module can be augmented by the power output of the second power generation engine of the second transportable module. In a similar manner, the data bandwidth offered by the data network service engine of the first transportable module can be augmented by the data bandwidth offered by the second data network service engine of the second transportable module. Additionally, one of ordinary skill in the art would understand and appreciate that more than two transportable modules can be combined together to achieve increased capacity or redundancy.

Depending on the embodiment, the two or more transportable modules may be connected by way of a wired connection between them. The two or more transportable modules may be in a master-slave configuration, where the maintenance engine of a "master" transportable module monitors the status of each of the transportable module and controls them accordingly. It should be noted that a maintenance engine (and the deployment engine) of a transportable module can utilize the same sort redundancy as the data network service engine and the power generation engine.

According to some embodiments, a method for providing localized power infrastructure and data infrastructure is provided, the method comprising: monitoring an internal operational condition and an external operational environment of a transportable system configured to provide localized power infrastructure and data infrastructure; using data from the monitoring to determine whether the transportable system or a component of the transportable system is operating according to an operational parameter and within a damage risk threshold; and based on the determination, controlling the transportable system or the component to ensure that that transportable system or the component operates according to the operational parameter and within the damage risk threshold. Depending on the embodiment, the transportable systems utilized by the method may similar to described herein.

According to further embodiments, various operations and functionality described above are implemented using a computer. For example, some embodiments provide for a computer program product comprising a computer useable storage medium having computer program code embodied therein for monitoring or controlling the data service network engine, the power generation engine, the maintenance engine, or the deployment agent according to the functions and operations described herein.

According to another embodiment, a method of delivering, installing, monitoring, protecting, and repairing transportable systems is provided. Depending on the embodiment, the various operations of the method may be performed by a single individual, multiple individuals, a company, multiple companies, or individuals.

In one embodiment, the user contacts a service to deliver and install a transportable system at a dwelling. The user may lease or purchase the transportable system. The user may enlist a service to monitor, maintain or repair the transportable system; the service may charge for the various services it offers for the transportable system. For example, the service may charge for delivering and installing the transportable system, or charge a monthly fee or a per-call fee for monitoring and repairs.

Where a service is enlisted to monitor and repair the transportable system, monitoring may be accomplished via a remote control of the self-diagnostics, where the self-diagnostics (e.g., of the maintenance engine) is triggered by one or more events (e.g., passage of time, date, hours of use, user request, etc.). Upon detecting an anomaly, the transportable system may send an alert to the user or service. Usually, in response to the anomaly, the service may come to repair the system. Alternatively, when an anomaly is detected, the service may contact the user, and via interfaces (e.g., computer monitoring, cameras, telephone, etc.), the service may instruct the user to perform certain repairs.

In other embodiments, the service enlisted may be to protect the transportable system. In some embodiments, protecting the system may involve reacting to damage risk conditions such as incoming a hailstorm. A service may instruct the transportable system to open a hail umbrella to protect the solar panels. In other embodiments, the system may monitor for and alert the user or service upon detection of such damage risk conditions, thereby enabling the user or service to react by opening the hail umbrella (or other protective measure).

According to another embodiment, a utility system for providing localized power infrastructure and data infrastructure is provided. The utility system can comprise a central system configured to monitor or control a plurality of transportable systems that provide power infrastructure and data infrastructure; and the plurality of transportable systems, wherein at least one of the plurality comprises: a data network service engine configured to function as a local data network service provider, a power generation engine configured to function as a local power service provider that generates and distributes power locally, and a maintenance engine configured to maintain operation and security of the transportable system by: monitoring an internal operational condition and an external operational environment of the transportable system, using data from the monitoring to determine whether the data network service engine and power generation engine are operating according to an operational parameter and within a damage risk threshold, and based on the determination, controlling the data network service engine, or the power generation engine to ensure that the data network service engine and the power generation engine continue to operate according to the operational parameter and within the damage risk threshold.

Such an embodiment can operate as an alternative to, or in addition to, traditional utility systems. Depending on the embodiment, the transportable systems may deployed to remote locations in the world, while the central system is operated by a third party charged with monitoring and, possibly, maintaining the transportable systems. The third party may also be a company that either sells, rents, or leases the transportable systems to users. Where the transportable system is rented or leased, a billing engine equipped in either the transportable system, the central system, or both accounts for client's use of power and data provided by the transportable system.

For some embodiments, the central maintenance engine can monitor and collect information regarding a transportable system's internal operational conditions or its external operational environment, much like the maintenance engine of the transportable system, except the monitoring is performed over a data connection between the transportable system and a third party, data network service provider. The central system may also have a diagnostic engine configured to detect and possibly remedy an error in a transportable system. The central system's diagnostic engine can also alert a systems operator to such an error, schedule a maintenance call for the transportable system, or both.

In further embodiments, the central maintenance engine also controls the transportable system. For example, the central maintenance engine can instruct the transportable system to disable specific components (e.g., solar panels, wind turbine, fuel cell), or modify an operational parameter of the transportable system (e.g., how to balance concurrent use of power sources).

In additional embodiments, the utility system or transportable system can comprise a billing engine configured to account for usage of power from the power generation engine, usage of data on the data network service engine, or both. Take for instance where a person using the data network service of the transportable system has utilized 200 MB of bandwidth from the data network service engine for a given a day. The billing engine, either located at the transportable system, at a central (control and monitoring) system, or both, would account for the 200 MB of data usage and, possibly, also account for the power from the power generation engine used to by the data network service engine when the 200 MB bandwidth was provided.

Depending on the embodiment, the billing engine may provide such (power and data) accounting information to a billing department charged with billing and collecting funds from those using power and data from a transportable system. For example, the billing engine at a transportable system may transmit power and data usage information either directly or indirectly (through a central billing engine) to a billing department, which handles the billing and collections of fees due for such usage.

According to another embodiment, a method is provided for providing localized power infrastructure or data infrastructure, the method comprising: deploying a transportable system to a client site, wherein the transportable system provides localized power infrastructure or data infrastructure to a client at or near the client site; establishing a data network service connection between the deployed transportable system; using the deployed transportable system to provide local power service or local data service to the client; monitoring usage of the power service or the data service by the client, thereby resulting in usage information; receiving the usage information from the transportable system over the data network service connection; and billing the client based on the usage information. For example, central system can be configured to establish a data network service connection with a deployed transportable system; receive a client's power or data usage information from the deployed transportable system over the data network service connection; and bill the client according to the client's power or data usage information. In turn, the transportable system can be configured to be deployed to a client site at or near the client; establish a data network service connection with a central system; provide power or data service to the client; monitor the usage of the power or data service; and send information relating to the usage of the power or data service to a central system.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The drawings illustrate by way of example concepts believed to be useful to facilitate a reader's understanding of techniques described in this paper. It should be noted that for clarity and ease of illustration these drawings may or may not be to scale.

Figure 1:
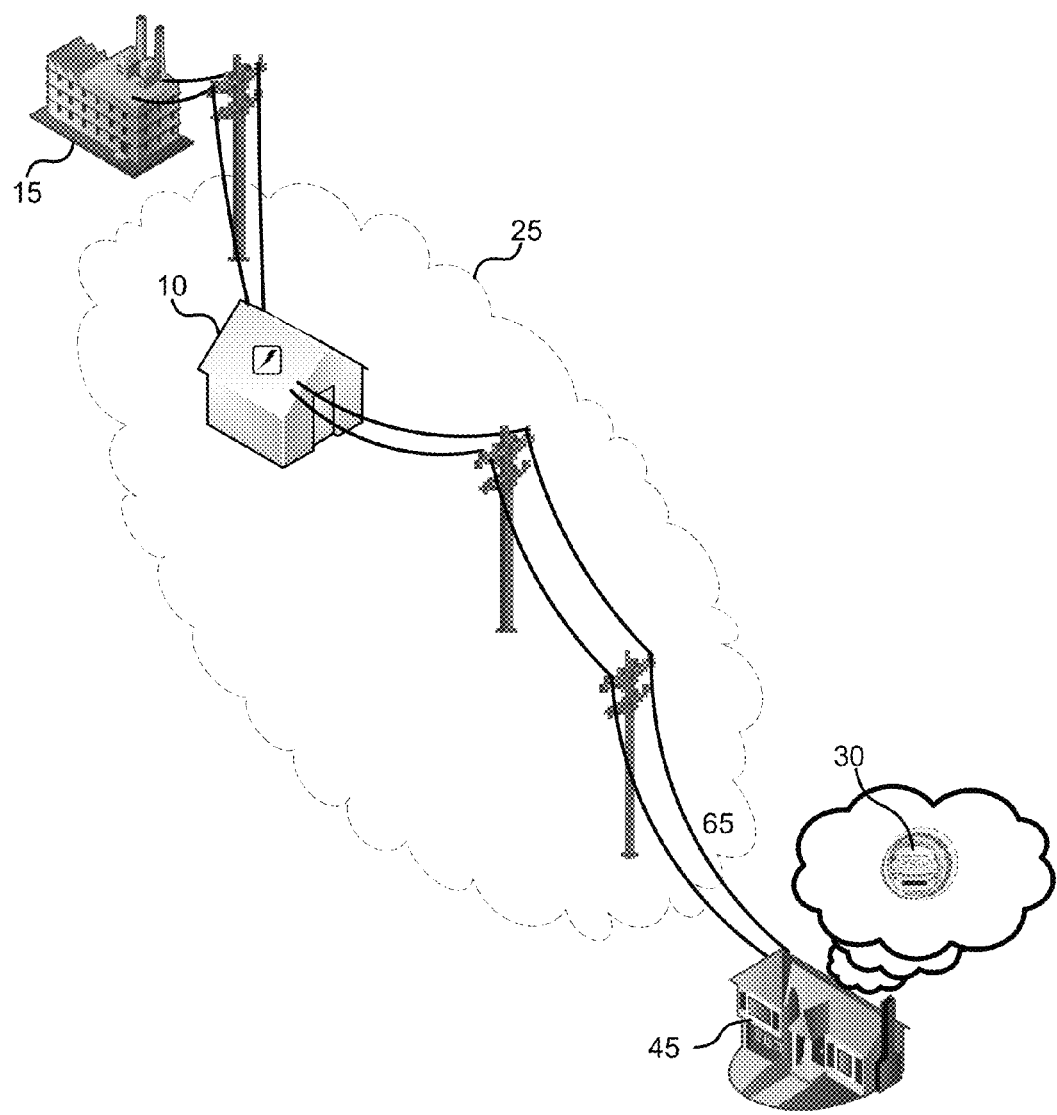
FIG. 1 is a diagram illustrating traditional power infrastructure.
Figure 2:
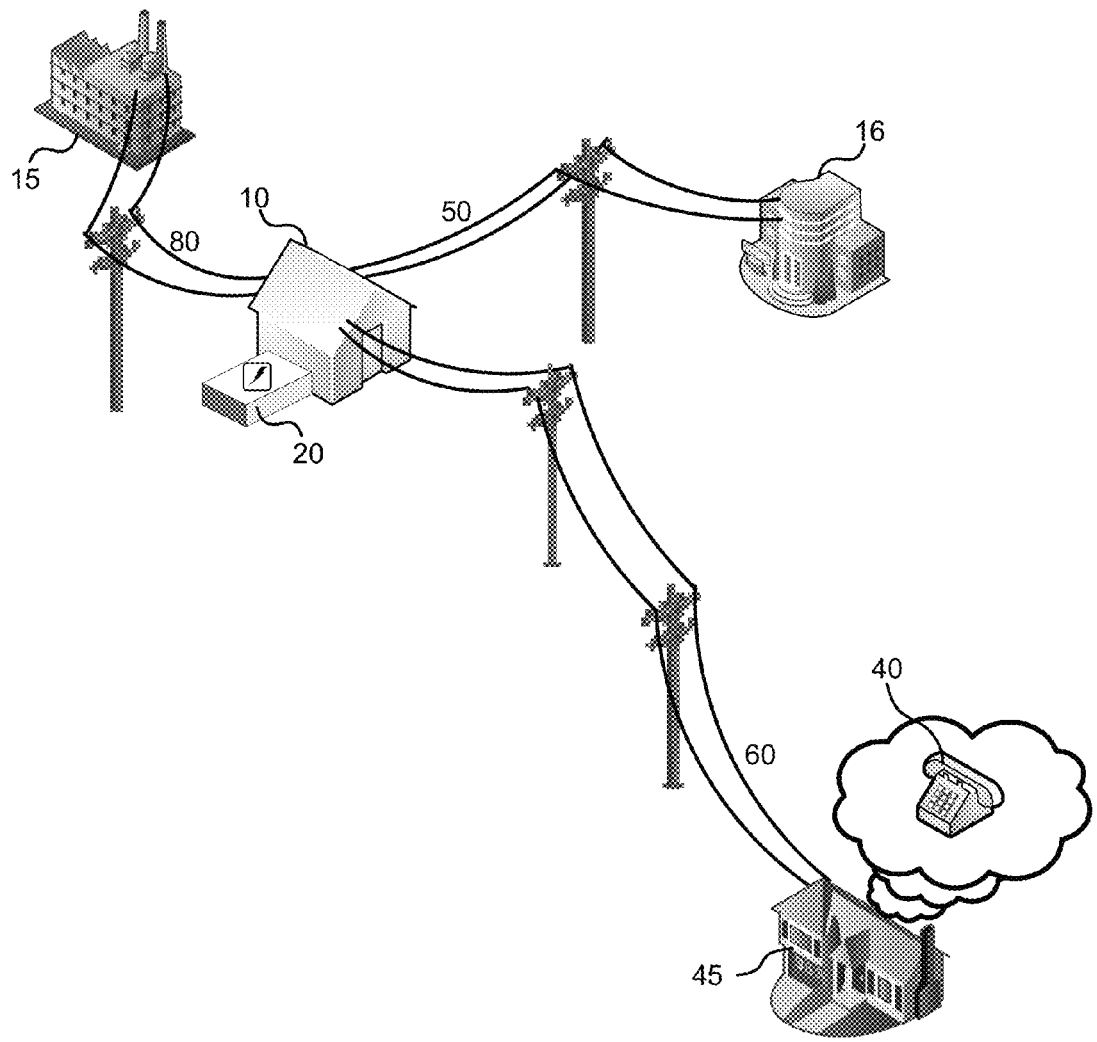
FIG. 2 is a diagram illustrating traditional communications infrastructure in conjunction with a traditional power infrastructure.
Figure 3:
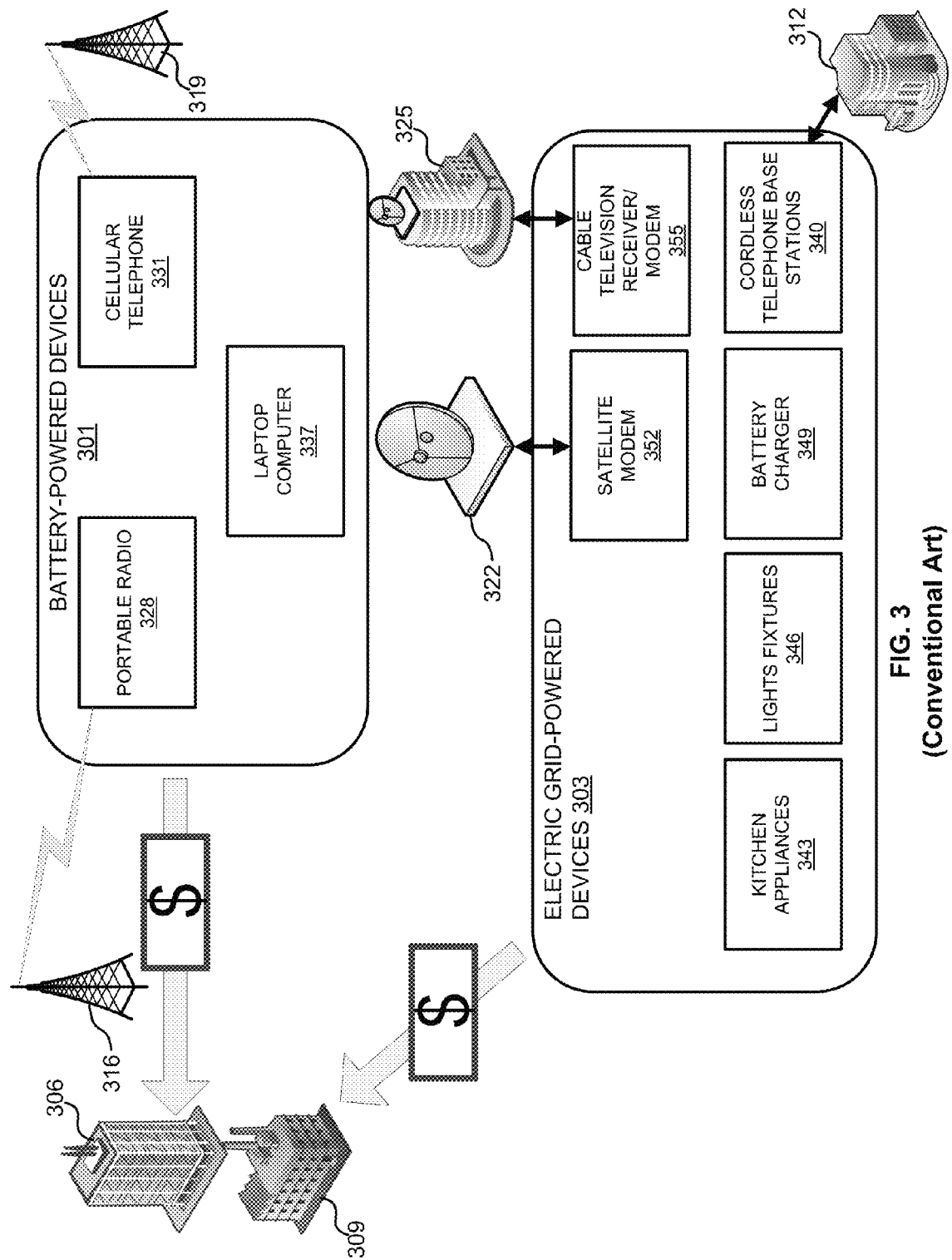
FIG. 3 is a diagram illustrating equipment and respective power sources.

The figures are not intended to be exhaustive or limited to the precise form disclosed.

DETAILED DESCRIPTION OF THE EMBODIMENTS OF THE INVENTION

In the description herein, a preferred embodiment of the invention is described, including preferred systems, methods, components, and process steps. After reading this application, those skilled in the art would realize that embodiments of the invention might be implemented using a variety of other components and techniques not specifically described, without undue experimentation or further invention, and that such other components and techniques would be within the scope and spirit of the invention.

Lexicography

The following terms relate or refer to aspects of the invention or its embodiments. The general meaning of each of these terms is intended to be illustrative.

The phrase "power infrastructure" describes an underlying framework and structure of a system for providing (also referred to as "delivering" or "transmitting") power to consumers of the power (also referred to as "users"). For example, power infrastructure may include power transmission lines, power substations, power plants, and power transformers. The power infrastructure could also include pipes for delivering fuel, such as natural gas.

The phrase "data infrastructure" describes an underlying framework and structure of a system that facilitates data communications and delivers data network service to data network customers (e.g., data users). For example, data infrastructure may include telephone and data lines, network backbones, cellular towers, public switch telephone network (PSTN), central offices, satellites, and microwave transmitters and receivers. Television and radio networks are likewise examples of data infrastructure.

The phrase "internal operational condition" describes a condition internal to the transportable system during the transportable system's operation. For example, the internal operational condition may include the (internal or external) temperature of a component of the transportable system, humidity within a component of the transportable system, measured performance of a component of the transportable system (e.g., data rate for a data network service engine, or the power output of a power generation engine), and fluid level such as battery electrolyte or engine oil/coolant The phrase "external operational environment" describes an environment around the transportable system during the transportable system's operation. For example, the external operational environment may include the temperature around the transportable system at the current location of the transportable system, weather conditions (e.g., humidity or wind, dust or flood event), or the like.

As described herein, the phrase "operational parameter" describes a variable providing a value that specifies, defines, or limits an operation of the transportable system. For example, an operational parameter may define a minimum data connection quality of the transportable system's data network service engine. If and when the data network service engine ceases to maintain the specified data connection quality (e.g., data signal strength), the transportable system may determine an adjustment to the entire transportable system or to merely a component of the transportable system is necessary to achieve the data signal strength specified by the operational parameter (e.g., moving or repositioning the transportable system, or the long-range satellite or the antenna used to connect the data network service engine to a data network service provider).

As described herein, the phrase "damage risk threshold" describes a quantified level of risk of danger to the transportable system or a component thereof, at or after which the risk to the transportable system or the component is unacceptable without a change to the transportable system. For example, a determination may be made by the transportable system or a component thereof when the monitored data meets or exceeds the danger risk threshold described herein. For instance, if the transportable system or a component thereof determines, from an internal operation condition or an external operational environment, that the temperature around the transportable system exceeds a danger risk threshold (e.g., temperature risk threshold) for the transportable system to continue operating.

As used in this paper, an engine includes a hardware component, such as a processor (and, optionally, firmware or software modules that are executed by the processor), that is capable of executing a function. Depending upon implementation-specific or other considerations, an engine can be centralized or its functionality distributed. An engine with a processor can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. For example, a power generation and distribution engine is a piece of hardware or hardware in combination with software that performs power generation and distribution functions.

System Elements

Figure 4:
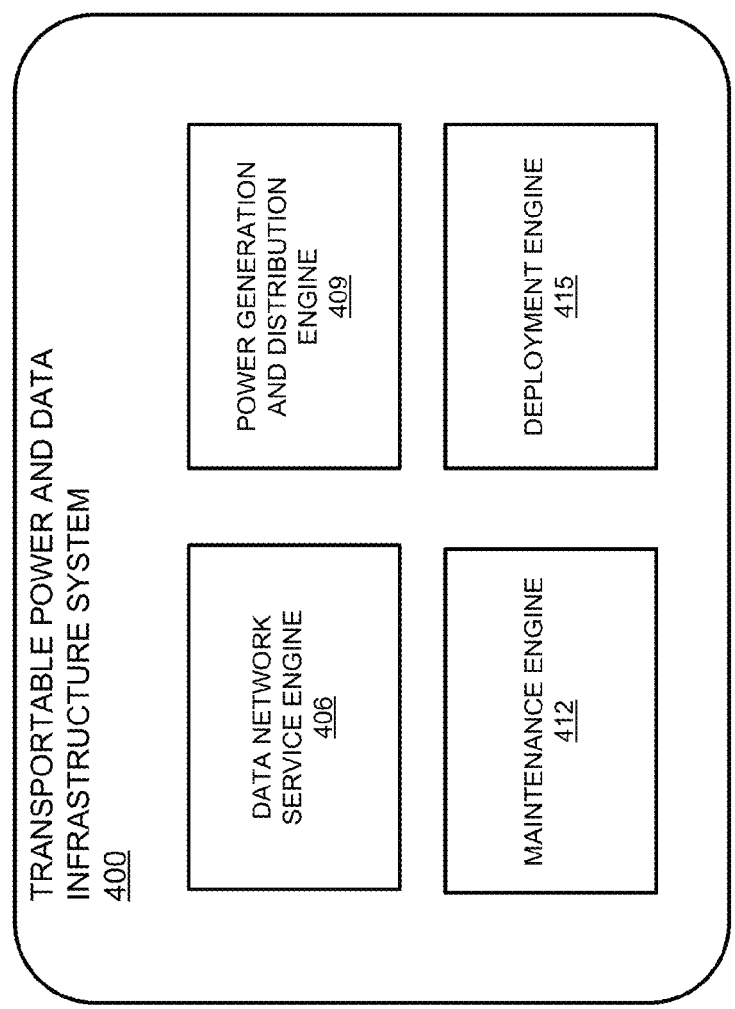
FIG. 4 is a diagram illustrating an example of a transportable power and data infrastructure system.

FIG. 4 is a diagram illustrating an example transportable power and data infrastructure system 400 in accordance with one embodiment of the invention. As illustrated in FIG. 4, system 400 comprises a data network service engine 406, a power generation and distribution engine (also referred to herein simply as a, "power generation engine") 409, a deployment engine 415, and a maintenance engine 412.

As described herein, data network service engine 406 can be configured to function as a local data network service provider. For example, in some embodiments, the local data network service provider functions as a local Internet service provider where data infrastructure for local Internet service does not exist. In some embodiments, data network service engine 406 can be configured to connect a third party data network service provider and from this service, provide local data network service. Data network service engine 406 can connect to a third party data network service provider by utilizing a satellite data network connection (e.g. Internet service over a satellite connection) over a satellite connection module. Alternatively, data network service engine 406 can utilize a WiMAX connection, a 2G/3G/4G cellular data connection, or some other wireless network connection, to connect with a third party data network service provider. Alternatively, data network service engine 406 can utilize a wired data service connection, such as a Digital Subscriber Line (DSL) connection or a cable television connection, to establish a connection with a third party data network service provider. Once data network service engine 406 has established a connection with a third party data network service provider, data network service engine 406 can provide data network services as if it is a local provider. As noted herein, such local service is useful in areas that lack communications infrastructure that supports such data network service.

Referring now to power generation and distribution engine 409, as described herein, power generation and distribution engine 409 can be configured to function as a local power service provider that generates and distributes power locally. For example, power generation engine 409 can be configured to concurrently use one or more power sources to generate power; the power generated can then be distributed locally via a hardware interface. The hardware interface, for instance, can connect power generation engine 406 to local power consumers to provide power service (e.g., dwellings in close proximity to the transportable system, or a "hub" from which dwellings in close proximity to the hub draw power).

Turning now to deployment engine 415, as described herein, deployment engine 415 can be configured to assist in deploying one or more components of the transportable system to operate the transportable system. For example, deployment engine 415 can comprise a mast comprising a satellite, antenna, a security camera, or a flood light, wherein the mast can retract (e.g., telescope in or fold down) during transport or when retracted to avoid damage, and be deployed (e.g., telescope out) during use of the transportable system. In another example, the deployment engine 415 can comprise a hydraulic, electric, or pneumatic device (e.g., crane) which can be utilized to move components of the transportable system during deployment. For instance, where a transportable system is transported on a trailer or a flatbed truck, the transportable system comprising power generation engine that includes a generator, the crane of a deployment engine 415 may be utilized to move the generator off the trailer or the flatbed and on to the ground next to the trailer or flatbed. This may be desirable, for example, when components of the transportable system such as certain storage batteries are sensitive to vibration and the generator of the transportable system vibrates during operation.

As described herein, a maintenance engine 412 can be configured to maintain operation and security of the transportable system. Maintenance engine 412 might operate and secure the transportable system by controlling data network service engine 406, power generation and distribution engine 409, or deployment engine 415.

For instance, based on data obtained when monitoring an internal operational condition and an external operational environment of the transportable system, maintenance engine 415 can determine whether the data network service engine 406 and power generation and distribution engine 409 are operating according to an operational parameter. This can include, for example, maintenance engine 415 determining whether power generation and distribution engine 409 is generating and outputting enough power for distribution, in accordance with an operational parameter of the transportable system. Where the maintenance engine 415 determines that enough power is being generated and outputted by power generation and distribution engine 409 to provide for its power load, maintenance engine 415 may or may not make adjustments to the transportable system 400. On the other hand, if maintenance engine 415 determines power generation is inadequate, maintenance engine 415 can implement adjustments to one or more of its power sources to account for the power shortfall (e.g., solar panel, wind turbine, fuel cell, water turbine, or power generator, where applicable). Adjustments can include repositioning of a solar panel, wind turbine, or water turbine of transportable system 400 so that they produce more power. In situations where less than all of the power sources available to transportable system 400 are utilized (e.g., solar panels and wind turbines), maintenance engine 415 may control the power generation and distribution engine 409 to enlist the services of available but unused power sources (e.g., an available fuel cell or power generator) in order to meet the power generation and output requirement of the operational parameter. Further, where transportable system 400 is interconnected with a second, similar or identical transportable system (not shown), maintenance engine 415 may control and utilize the second transportable system's power generation and distribution engine to augment the output of power generation and distribution engine 409.

As described herein, based on data from its monitoring of an internal operational condition and an external operational environment of the transportable system, maintenance engine 415 can also determine whether data network service engine 406 and power generation and distribution engine 409 are operating within a damage risk threshold, and based on the determination, control data network service engine 406, power generation and distribution engine 409, or deployment engine 415 to ensure that transportable system 400 continues to operate within a damage risk threshold. For instance, where maintenance engine 415 determines, from the internal operational condition, that the operating temperature of power generator of power generation and distribution engine 409 exceeds an operational parameter; once the measure of power generator's operating temperature exceeds a damage risk threshold, maintenance engine 415 can suspend power generation functions to avoid damage to transportable system 400. Maintenance engine 415 can further activate another power source to replace the power generator's output, or alert a system operator of the issue regarding the power generator. Where the power generation and distribution engine 409 is entirely deactivated by maintenance engine 415, maintenance engine 415 can continue to operate on battery power until power generation and distribution 409 can resume operation.

Figure 5A:
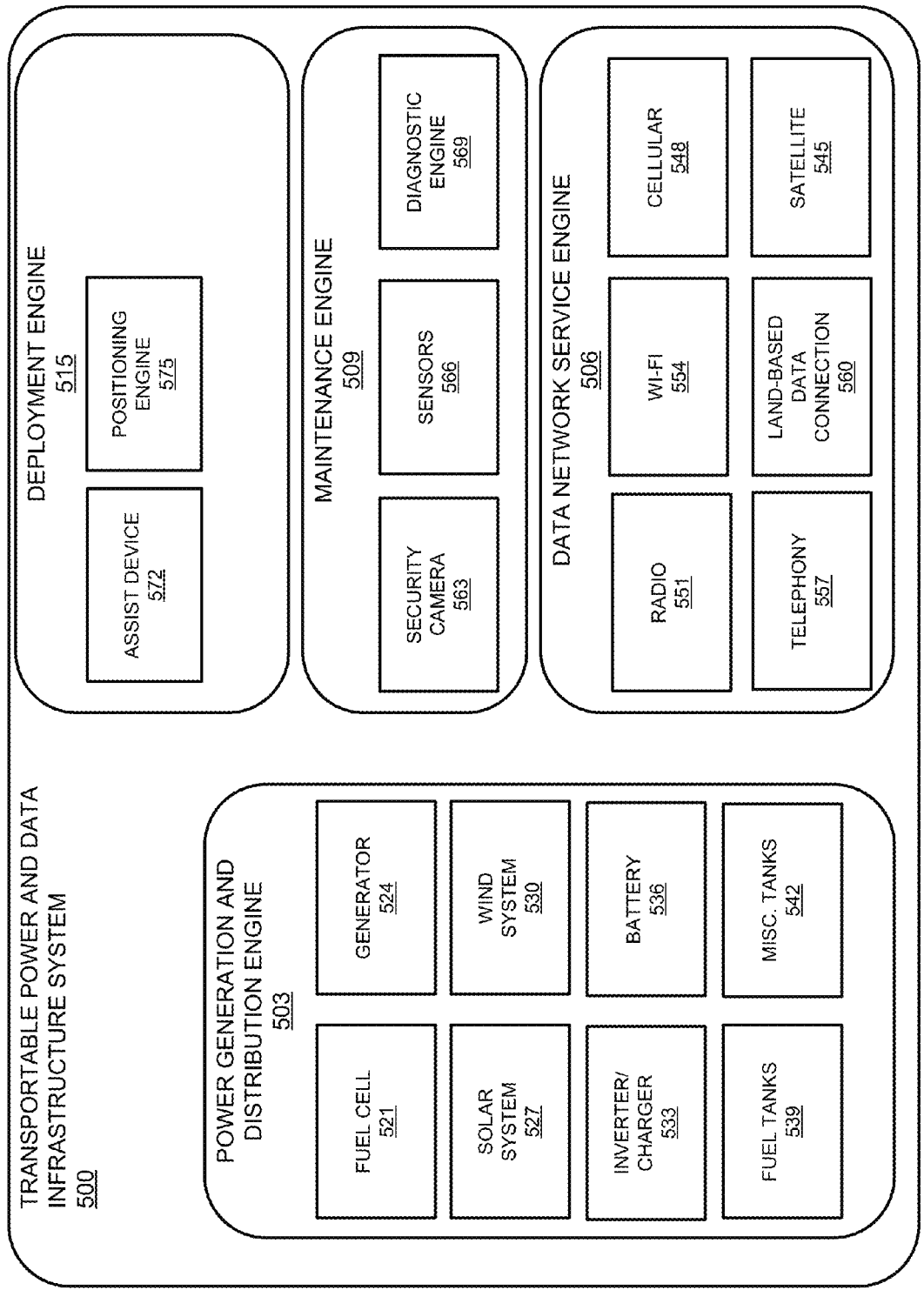
FIG. 5A is a diagram illustrating an example of a transportable power and data infrastructure system.

FIG. 5 is a diagram illustrating an example of a transportable power and data infrastructure system 500. In the example of FIG. 5A, system 500 includes a power generation and distribution engine 503, a data network service engine 506, a maintenance engine 509, and a deployment engine 515. Power generation and distribution engine 503 comprises multiple power source options, including fuel cell 521, generator 524, solar system 527 (including a solar panel), and wind system 530 (including a wind turbine). Power generation and distribution engine 503 also comprises fuel tanks 539, one of which stores and provides gasoline, diesel, propane, natural gas or some similar fuel to generator 524; and battery 536, which to stores energy from the solar system 527, wind turbine 530, or another power source, for later user. Battery 536 can also be utilized to: (a) start generator 524 and (b) power various components of transportable system 500, including maintenance engine 509, when all other power generating sources (e.g., generator, solar, wind, fuel cell) are unavailable or inactive. As such, battery 536 may comprise a starter battery for starting the generator, and a deep cycle battery for providing power for longer durations to components of transportable system 500.

Inverter/charger 533 of power generation and distribution engine 503 allows transportable system 500 to convert Direct Current (DC) electricity provided by battery 536 or solar system 527 into Alternating Current (AC) usable by common AC devices and appliances.

Fuel cell 521 may use hydrogen, or some other fuel, to perform an electrolysis process that produces electricity. Hydrogen for fuel cell 521 may be stored in one of the fuel tanks 539. Miscellaneous tanks 542 may include tanks that store engine oil, battery distilled water, radiator fluid, compressed air (e.g., for pneumatic devices of transportable system), hydraulic fluid (e.g., hydraulic devices of transportable system), and other fluids and gases that may be useful for maintaining transportable system 500 and provide it with redundancy (e.g., extra fuel).

In the example of FIG. 5A, the deployment engine 515 includes an assist device 572 and a positioning engine 575. The assist device can include hydraulic, electronic, pneumatic, or other systems (not shown) that assist in deployment of one or more components of transportable system 500 and its components. For example, assist device 572 can include a crane that assists in moving a component from transportable system 500 and placing it somewhere adjacent to transportable system 500. Other assist devices can assist in raising/lifting a component of transportable system 500, such a telescoping or non-telescoping mast. Positioning engine 512 can be configured to move transportable system 500 or a component thereof (e.g., mast, satellite, security camera, motion sensor, wind turbine, solar panel). For some embodiments, positioning engine 512 performs a move when instructed to do so by maintenance engine 509, which can exercise such control in accordance an operational parameter or a damage risk threshold.

In the example of FIG. 5A, data network service engine 506 comprises radio component 551, Wi-Fi (802.11x) 554 component, cellular component 548, telephony component 557, land-based data connection component 560, and a satellite component 545. Radio component 551 can be utilized to receive radio signals (e.g., over the air radio broadcasts, citizen's band (CB) radio signals) or transmit radio signals (e.g., CB radio signals). Wi-Fi component 554 can be utilized to provide local data network service to local Wi-Fi users. For example, in some embodiments, Wi-Fi component 554 provides local data network service to local Wi-Fi users by relaying data between local Wi-Fi users and the data network service connection established between the data network service engine and a third party data network service provider (e.g., Internet Service Provider), where the connection with the third party data network service provider is provided by a wired connection (e.g., DSL or cable television line), or via a wireless connection (e.g., cellular data connection, or satellite data connection).

Cellular component 548 can facilitate a cellular data network service connection between transportable system 500 and a cellular tower that provides data network service from a third party. Similarly, satellite component 545 can facilitate a data network service connection between transportable system 500 and a satellite that provides data network service from a third party. Likewise, land-based data connection component 560 can facilitate a data network service connection between transportable system 500 and a wired connection to a central office that provides wired data network service (e.g., DSL or cable television line. Accordingly, data connection component 560 may comprise a wired modem (e.g., DSL, cable television, telephony-based) in order to establish the wired connection.

It should be understood that connecting to a third party, data network service provider through cellular component 548, satellite component 545, or land-based data connection component 560 both allows transportable system 500 to provide local data network service to local data service users, and allows a systems operator to monitor and control transportable system 500 over a data network (e.g., the Internet).

Telephony component 557 can be configured to provide local users with a wired telephony service. For example, telephony component 557 can be configured to provide local users with POTS, while transportable system 500 acquires telephone service via a cellular voice connection (e.g., via cellular component 548) or via a satellite voice connection (e.g., via satellite component 545).

In the example of FIG. 5A, maintenance engine 509 can comprise a security camera 563, one or more sensors 566, and a diagnostic engine 569. In some embodiments, security camera 563 can be utilized to monitor and protect transportable system 500 by allowing a systems operator to remotely view, remotely record or locally record the surrounds of transportable system 500. Alternatively, security camera 563 can be utilized by maintenance engine 509 to sense motion. Sensors 566 can include accelerometers, a geographical positioning system (GPS), compasses, thermostats, pressure sensors, vibration sensors, humidity sensors, power sensors, motion sensors, and photo sensors. As described herein, for some embodiments, sensors 566 are utilized by maintenance engine 509 to monitor and collect data regarding internal operational conditions and external operational environment. Sensors 566 can be disposed internally or externally with respect to components of transportable system 500. Each component of transportable system 500 may or may not have its own set of sensors to monitor and secure that particular component.

Maintenance engine 509 can also comprise a diagnostic engine 569. Based on internal operational conditions and external operational environment, diagnostic engine 569 can locally detect errors in transportable system, diagnose the issue causing the error, and either self-remedy the issue or, alternatively, alert a systems operator of the error and instructions or suggestions, if applicable. As described herein, transportable system 500 can also provide diagnostic information (or, alternatively, the internal operational condition or the external operational environment) to a central diagnostic engine (e.g., 513 in FIG. 5B) contained in a central system (e.g., 510 in FIG. 5B). Depending on the embodiment, a central maintenance engine may be configured to remotely monitor or control a transportable system 500 via a data network service connection established between transportable system 500 and a third party, data network service provider. More with respect to central systems and central maintenance engines is discussed below with respect to FIG. 5B, which illustrates an example topology of transportable systems in accordance with an embodiment.

Figure 5B:
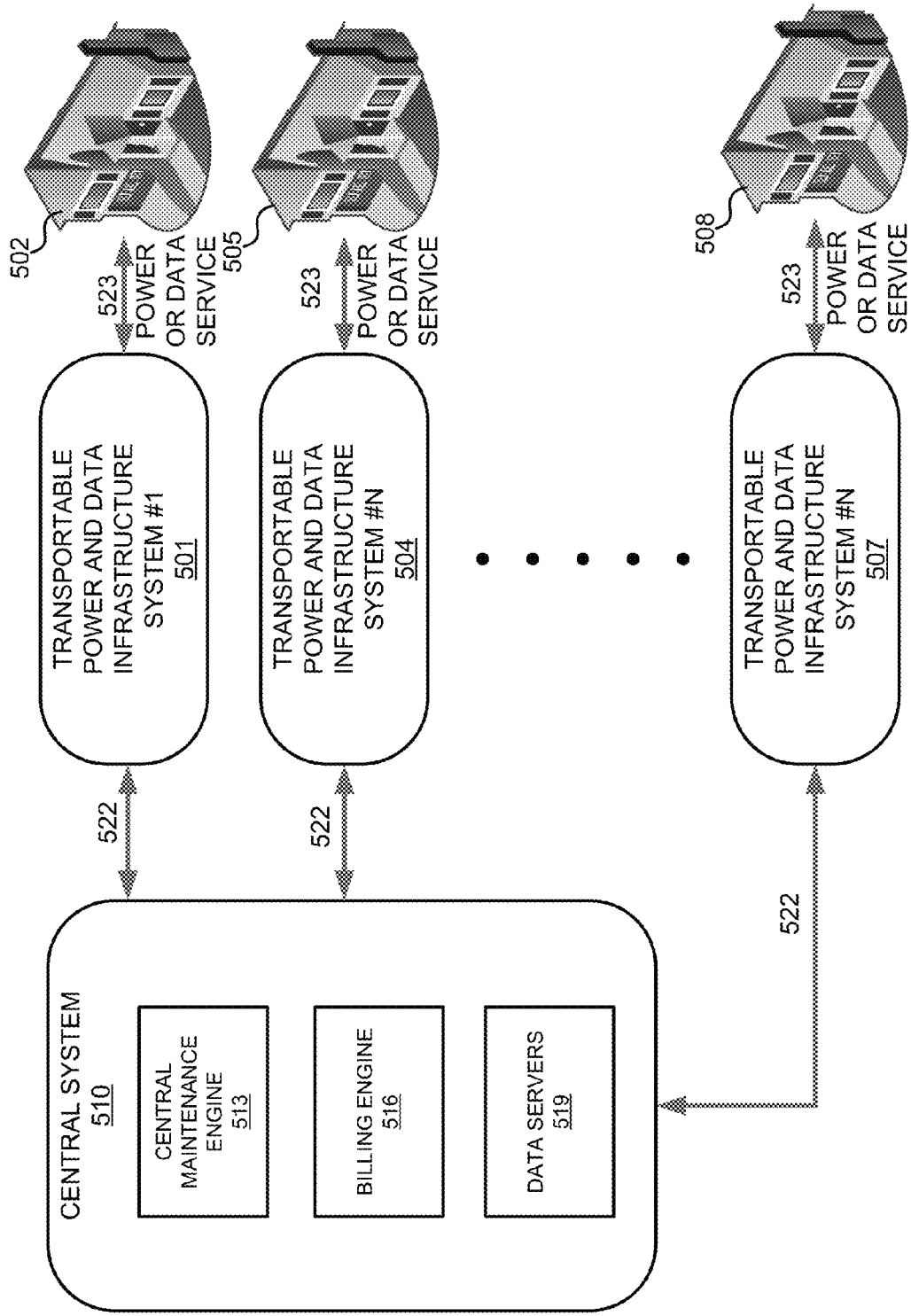
FIG. 5B is a diagram illustrating an example of transportable systems for providing power infrastructure or data infrastructure configured in an example topology.

FIG. 5B is a diagram illustrating an example of transportable systems for providing power infrastructure and data infrastructure configured in an example topology. In the example of FIG. 5B, the configuration comprises a central system 510, and a plurality of transportable power and data infrastructure systems #1 . . . N, each of which is connected to central system 510 and serves a different dwelling (502, 505, and 508). It should be noted that although the example of FIG. 5B is illustrated with transportable systems that provide both power and data infrastructure (i.e., transportable power and data infrastructure systems), one should understand that a transportable system that provides only power infrastructure or only data infrastructure could also be utilized in place of or in conjunction with the transportable power and data infrastructure systems illustrated.

In the example of FIG. 5B, central system 510 can include a central maintenance engine 513, a billing engine 516, and a content distribution engine 519. Central maintenance engine 513 uses a third party, data network service connection 522 to monitor and collect information regarding a transportable system's internal operational condition or its external operational environment.

Once a transportable system (e.g., 501, 504, and 507) is deployed, it can establish a data network service connection 522 with central system 510 through a third party, data network service provider. Through data network service connection 522, central system 510 can receive information relating to an internal operational condition, an external operational environment, or both from each of the plurality of transportable systems (e.g., 501, 504, and 507). This information can be monitored or analyzed in real-time by central maintenance engine 513, stored on data servers 519 for future retrieval and analysis, or both. The information centrally monitored by central system 510 ensures proper operation and service of deployed transportable systems, and ensures optimal efficiency of the transportable systems, while respecting specific user constraints and performing accurate billing for power or data services provided.

Examples of information relating to an internal operational condition or an external operational environment of transportable system include: fuel level (for generators, fuel cells etc.); fuel consumption; scheduling delivery of fuel; information relating to on-site generated fuel (hydrogen, bio-fuel, etc.); information relating to fuel filters; water/electrolyte levels of the batteries; temperatures of various components (e.g., batteries, inverters, transformers, generator coolant, ambient, solar panels, and critical bearings); time of day and duration of operation of particular components; sun intensity; wind speed and direction; energy generated the power generation engine and components thereof; energy delivered to various loads (e.g., clients or other components, such as chargers); anomalous events (e.g., where thresholds set in an operational parameters of a transportable system, such as load, temperature, or physical shock, are exceeded); and make up of energy generated (e.g., percentage split between solar and fossil fuel generator).

For some implementations, central maintenance engine 513 can detect an error in one of the plurality of transportable systems, remedy a detected error, alert a systems operator of a detected error, and automatically schedule a maintenance call for the transportable system to remedy a detected error. Furthermore, from the information relating to internal operational condition or the external operational environment of a transportable system, central maintenance engine 513 can assess the present performance and overall condition of each of the transportable systems and, from that assessment, determine what maintenance tasks need to be performed for each of the transportable systems, now or in the future, or what the maintenance schedule should be for each of the transportable systems.

In the example of FIG. 5B, billing engine 516 can be configured to account for usage of power from the power generation engine, usage of data on the data network service engine, or both, by the illustrated dwellings (502, 505, and 508). For instance, after deployment, clients (e.g., dwellings 502, 505, and 508) can make use of the power generated by the transportable system, or data bandwidth provided through the transportable system. While power services or data services are being provided to the clients, a billing engine, located either at central system 510 (e.g., 516) or located at each transportable system (not shown), accounts for power or data usage. Where the billing engine is located locally, the local billing engine could forward the accounting information to central system 510 at regular or scheduled intervals. At central system 510, the accounting information is received by billing engine 516, which collects the accounting information from each of the transportable systems and either forwards it to billing department (e.g., of the utility company) for billing and collections, or posts it to data servers 519 for future retrieval. It should be noted that for embodiments where the transportable system provides data network service, data usage accounted for by billing engine 516 might include the power from the power generation engine used by data network service engine while the data network service engine provided the data usage.

In the example of FIG. 5B, data server 519 can be configured stored information collected by central maintenance engine 513 or billing engine 516. For example, data servers 519 can store the following information relating to a transportable system connected to central system 510: internal operational condition, an external operational environment, power usage by client, data usage by client, current status, current location, and current users. Data servers 519 can also be utilized to facilitate other known functionalities of a utility company, such as billing and service. Examples of information managed centrally at central system 510 (and, therefore, possibly stored on data servers 519) include: user names, addresses, contact information; detailed information on specific components requiring periodic maintenance/replacement (based on, for example, information relating to an internal operational condition or an external operational environment); any user-specified constraints; service history for each transportable system; information regarding local service agents responsible for servicing specified transportable systems; and the utility company's available services and rates.

With respect to operational parameters, it should be noted that in some embodiments, central system 510 can push a change or a new operational parameter to a transportable system through the data network service connection 522. Such new or changed operational parameters can be pushed to all deployed transportable system or to select transportable systems (regardless of whether deployed, as long as the data connection is present). Additionally, the new or change operational parameter may be parameters defined by the third party operating central system 510 (e.g., utility company, or maintenance/service company), or may be defined by a client using the transportable system. As noted herein, the user specified operational parameter may be stored on data servers 519 as a user-specified constraint. For some embodiments, a client can add or change a user-specified constraint, or some other operational parameter, through a website interface that allows them to directly configure the transportable system servicing them, or that allows them to configure the transportable system via central system 510. In other embodiments, a client can configure an operational parameter through a physical interface at the transportable system made accessible to clients. Examples of user defined operational parameters for transportable systems include user constraints (e.g., user settings defined in an operational parameter of a transportable system, such as don't start the generator at night or don't service on Tuesdays) and user requests (for supplies, request for service, ordering of additional services etc.).

In the example of FIG. 5B, central system 510 can function as a central node, while each of the plurality of transportable systems (501, 504, 507) functions as a distributed (power and data infrastructure) node. Each of the distributed nodes is remotely monitored, remotely controlled, or both by the central node via a third party data network service connection (522) established between the distributed node and a third party, data network service provider. The distributed nodes are networked with the central node such that a constellation of distributed power and data infrastructure nodes results, where central system 510 and the distributed noted (e.g., 501, 504, and 507) operate as a single utility system capable of providing power service (523) or data network service (523) to clients connected to the transportable systems (e.g., dwellings 502, 505, and 508). Such a configuration can operated as a utility model that is an alternative to, or in addition to, traditional power and data infrastructures.

For example, central system 510 may be operated by a third party functioning as a utility company. Such a utility company can distribute (for free or for a fee) and deploy a plurality of transportable systems (e.g., 501, 504, and 507) (i.e., distributed power and data infrastructure nodes) at multiple client sites (e.g., dwellings 502, 505, and 508), usually in remote locations of the world lacking power infrastructure, data infrastructure, or both. As described herein, once deployed the transportable systems can begin servicing clients (in relatively close proximity to the transportable system) as utility customers, providing them with power services, data service, or both. As also described herein, once deployed the transportable systems (e.g., 501, 504, and 507) also establish a data service connection (522) with central system 510 through which central system 510 can remotely monitor or remotely control the transportable systems. Data connections 522 between the transportable systems (e.g., 501, 504, and 507)

and central system 510 results in a constellation of networked, distributed power and data infrastructure nodes that can function as a utility company.

For some embodiment, when the constellation formed by the transportable systems connected to a central system is operated as a utility company, such a company can perform functions similar to those performed by traditional, central generator based energy utility companies (e.g., PG&E®) and traditional communications services companies (e.g., AT&T®, Verizon®). Such a utility company can also bundle other utility services with the power and data services provided through the transportable systems (e.g., satellite television, cable television, telephone services, cellular services).

It should be noted that in some embodiments, a central system 510 may be operated by a third party company merely charged with caring and maintaining the transportable systems.

Figure 6:
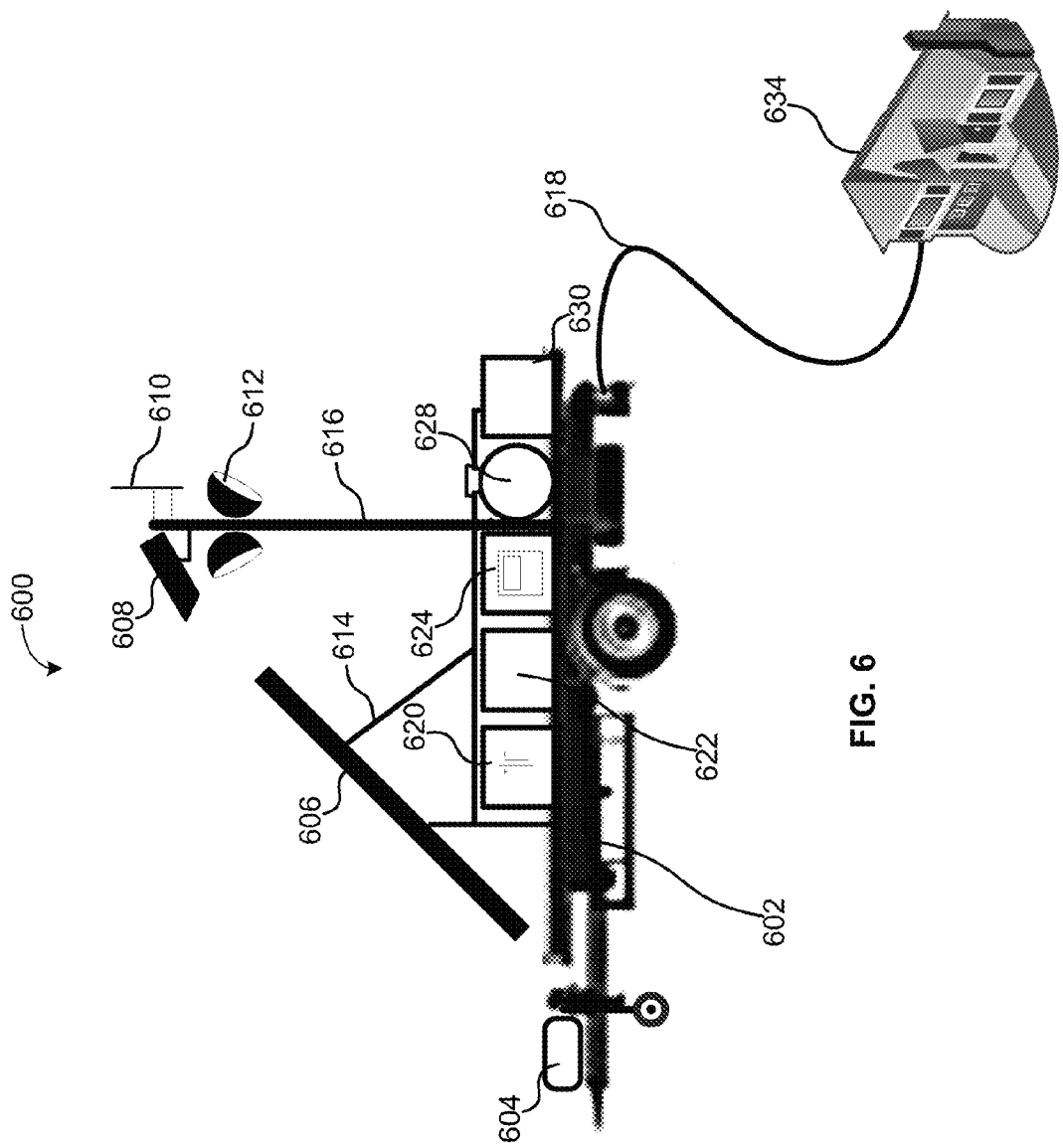
FIG. 6 is a diagram illustrating an example trailer-based transportable power and data infrastructure system.

FIG. 6 is a diagram illustrating an example trailer-based transportable system 600, which can be configured to provide local power and data service to one or more local dwellings. In the example of FIG. 6, is the system 600 includes a trailer 602, a positioning motor 604, solar panels 606 on static mounts 614, a camera 608 and a flood light 612 coupled to a mast 616, and an antenna 610 also coupled to the mast 616. Electrical and network wires 618 are coupled to an interface module and the dwelling 634. Trailer 602 further includes a battery 620, an inverter 622, one or more tanks 628 (fuel and miscellaneous), and a generator 630. Trailer 602 can also include a control panel 624 with indicators, fuses and power circuitry, which allows a systems operator physically present at trailer 602 to monitor and control the system 600.

Although shown as including solar panels 606, as noted herein, the power generation devices can alternatively or in addition include wind turbines, water turbines, batteries and/or gas generators. Additionally, although solar panels 606 are shown as coupled to mounts 614, solar panels 606 can be removed from the portable container and installed on mounts, a platform or on the ground. This can be performed, for example, with the assistance of a crane (not shown) of a deployment engine, thereby isolating solar panels 606 from the vibration produced by other components of transportable system 600. In another example, solar panels 606 can be pre-installed on lever arms (not shown) of the deployment engine for rapid unfolding and refolding into position.

Similarly, a wind turbine (not shown) can be removed from trailer 602 and positioned to receive wind flow. Depending on the embodiment, the wind turbines may be attached to the portable container on a telescoping or rotating poles.

Generator 630 may be needed for power generation during nighttime or when the solar panels or wind turbines cannot provide sufficient power for the power load. As described herein, depending on the embodiment, battery 620 may be used to store energy generated by solar panels 606, a wind turbine or generator 630 for future (e.g., nighttime) use, or to smooth the energy output from solar panels 606, the wind turbine or generator 630.

Depending on the embodiment, transportable system 600 may be equipped with power circuitry (not shown) enabling generation of such voltage-current requirements as 110 VAC, 220 VAC, 25 VDC, or 12 VDC, as well as other voltages required by attached devices. As noted herein, the power circuitry can be configured to use multiple power sources concurrently. For example, the power circuitry of transportable system 600 can draw power in a hierarchical fashion (e.g., from the solar panels and wind turbines first, and then from the gas generator second).

In addition to electrical and network wires 618, transportable system 600 can comprise an interface module (not shown) that offers power outlets for supplying power to the dwelling 634, the system itself, or other loads. As described herein, antenna 610 (or a satellite dish, not shown) enables communication with ground-based radio antennas or with satellites utilized for data network service or telephone service.

Depending on the embodiment, transportable system 600 may utilize its data network service engine in conjunction with antenna 610 (or some other wireless communications device) to communicate wirelessly with other similar or identical transportable systems nearby. By doing so, when transportable system 600 is in range of another transportable system and has lost its connection to a third party, data network service provider (e.g., lost satellite access and needs to report a problem), transportable system 600 can request the other transportable system send an alert to a systems operator on its behalf, or (temporarily) utilize the second transportable system's third party, data network connection to reestablish its data network service connection.

In order to maintain performance of solar panels 606, transportable system 600 can be equipped with devices that ensure that solar panels 606 have an unobstructed view of the sun. For example, a leaf blower or snow blower, either controlled by a maintenance engine or by a simple timer, can be utilized to automatically clear solar panels 606 of any leaves or snow obstructing sunlight from the panels. To further assist solar panels 606 with receiving proper sunlight, when solar panels 606 are statically mounted to trailer 602 (via mounts 614), positioning motor 604 can be utilized to rotate trailer 602 (e.g., pivot) so that solar panels 606 can track the movement of the sun. Alternatively, if trailer 602 were equipped with a wind turbine, positioning motor 604 could similarly be utilized to rotate trailer 602 in order for the wind turbine to catch and track the wind. As previously noted herein, according to some embodiments, rather than rotate the entirety of trailer 602 to track the sun or wind, solar panel 606 or the wind turbine can be repositioned using, for example, a positioning motor attached to the mounts of the two power generating components.

With respect to damage prevention, as described herein, transportable system 600 can include a maintenance engine configured to recognize when weather conditions risk damaging components of transportable system 600. In response, the maintenance engine can automatically lower a deployed wind turbine, automatically cover the solar panels, automatically cover the interfaces, or shut down components of transportable system 600. As noted herein, transportable system 600 can include a variety of sensors, such as thermostats, accelerometers, pressure sensors, vibration sensors, humidity sensors, force sensors, power sensors, and photo sensors, which allow the maintenance engine to monitor international operational conditions and external operational environment.

In various embodiments, the exhaust from generator 630 can be configured to use an exhaust engine (not shown) to automatically direct exhaust away from the dwellings served by transportable system 600, regardless of the position of the trailer. For example, the exhaust engine can be disposed on generator 630's exhaust such that, no matter the position and direction of trailer 602, the exhaust is always directed in the same direction. In one embodiment, the exhaust engine comprises an electric, repositioning motor coupled to a rotatable exhaust tip such that the electric motor can direct the exhaust tip in a direction indicated by a maintenance engine. The maintenance engine of such an embodiment can determine the current direction of transportable system 600 (e.g., based on one or more of the maintenance engine's sensors) and determine whether the current direction of the rotatable exhaust tip complies with a direction specified in an operational parameter; where the current direction does not comply with the direction specified in the operational parameter, the electric motor of the exhaust engine can adjust the direction of the exhaust tip accordingly.

For the purposes of securing itself, transportable system 600 includes physical and system security to prevent tampering by a user or third parties. In some embodiments, the physical security can be as simple as a lock. With respect to remotely monitoring and controlling transportable system 600, system 600 might include username and password requirements to enable remote rights.

It should be noted that, in order to reduce the need for service and maintenance, and to increase the overall reliability of embodiments of the invention, some embodiments might include redundant components (e.g., multiple batteries) or oversized components (e.g., a double-size oil reserve).

As described herein, reliability can also be increased in some embodiments by interconnecting two or more transportable systems together to provide increased capacity or redundancy for the overall transportable system or its individual components. For example where two transportable systems similar to transportable system 600 were interconnected, the two transportable system could concurrently use the antenna 610 of their respective data network service engines to combine (and thereby increase) their power generating capability. Similarly, the two transportable systems could concurrently use the generator 630 of their respective power generation and distribution engines to combine (and thereby increase) their data network bandwidth. In other embodiments, the interconnection provides for redundancy of components. For example, the two transportable systems could monitor each other's "health" and upon detecting a failure of a component (e.g., generator 630, solar panel 606, or antenna 610), compensate for the other transportable system's failure (i.e., utilize its own generator 630, solar panel 606, or antenna 610 for the benefit of the other transportable system). Depending on the embodiment, the interconnection between transportable systems may be an ad-hoc configuration (e.g., no master system) or a master-slave configuration, where one transportable system functions as a "master" control of one or more "slave" transportable systems.

Method Elements

Figure 7A:
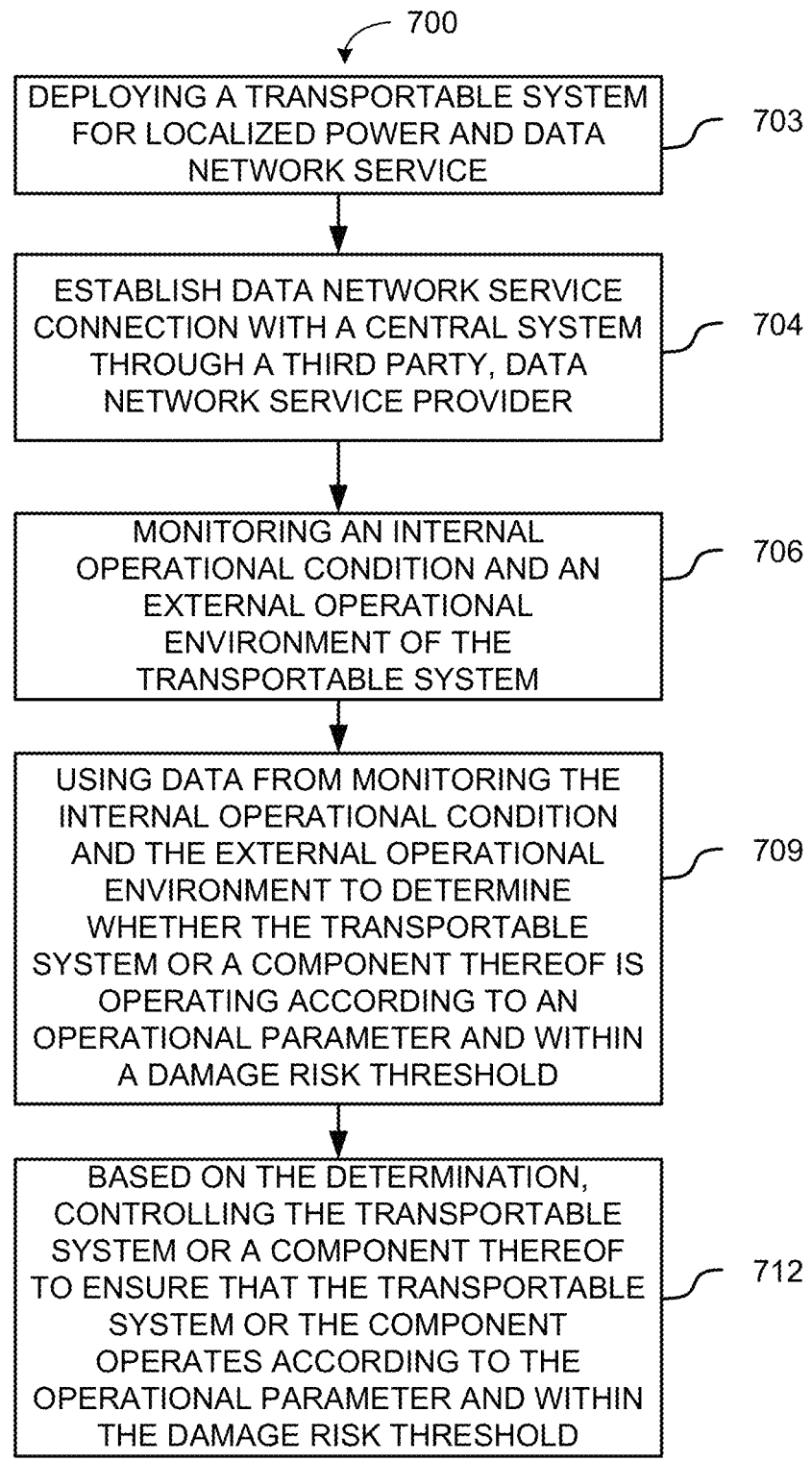
FIG. 7A is a flowchart illustrating an example of a method for deployment and operation of a transportable power and data infrastructure system.

FIG. 7A is a flowchart 700 illustrating an example of a method for deployment and operation of a transportable power and data infrastructure system. In the example of FIG. 7A, the flowchart 700 begins at module 703 with deploying a transportable system for localized power and data network service. The deployment of the transportable system can utilize a deployment engine to deploy components of the transportable system. For example, a crane or lever arm of the deployment engine to deploy a solar panel or raise a mast of the transportable system.

In the example of FIG. 7A, the flowchart 700 continues to module 706 with monitoring an internal operational condition and an external operational environment of the transportable system. A maintenance engine of the transportable system can perform such monitoring, or enable a systems operator to remotely perform such monitoring. The internal operational condition of the transportable system can include the operating temperature of a component of the transportable system, or the measured performance of a component (e.g., power output of a generator of the power generation and distribution engine).

In the example of FIG. 7A, the flowchart 700 continues to module 709 with using data from monitoring the internal operational condition and the external operational environment to determine whether the transportable system or a component thereof is operating according to an operational parameter and within a damage risk threshold. For instance, as described herein, a maintenance engine of the transportable system can determine that a solar panel or wind turbine of the power generation and distribution engine is not outputting enough power in accordance with an operational parameter.

In the example of FIG. 7A, the flowchart 700 continues to module 712 with, based on the determination, controlling the transportable system or a component thereof to ensure that the transportable system or the component operates according to the operational parameter and within the damage risk threshold. For instance, based on the external operational environment of the transportable system, the maintenance engine can determine when hail is falling on or near the transportable system; the maintenance system, in response to such a determination, can act to protect components of the transportable system (e.g., cover a solar panel with an umbrella, cover a control panel with a control panel cover, retract a mast, etc.).

Depending on the embodiment, the operations of method 700 may be performed by a maintenance engine of the transportable system, other components of the transportable system, or locally or remotely by a systems operator who is monitoring and controlling the transportable system.

Figure 7B:
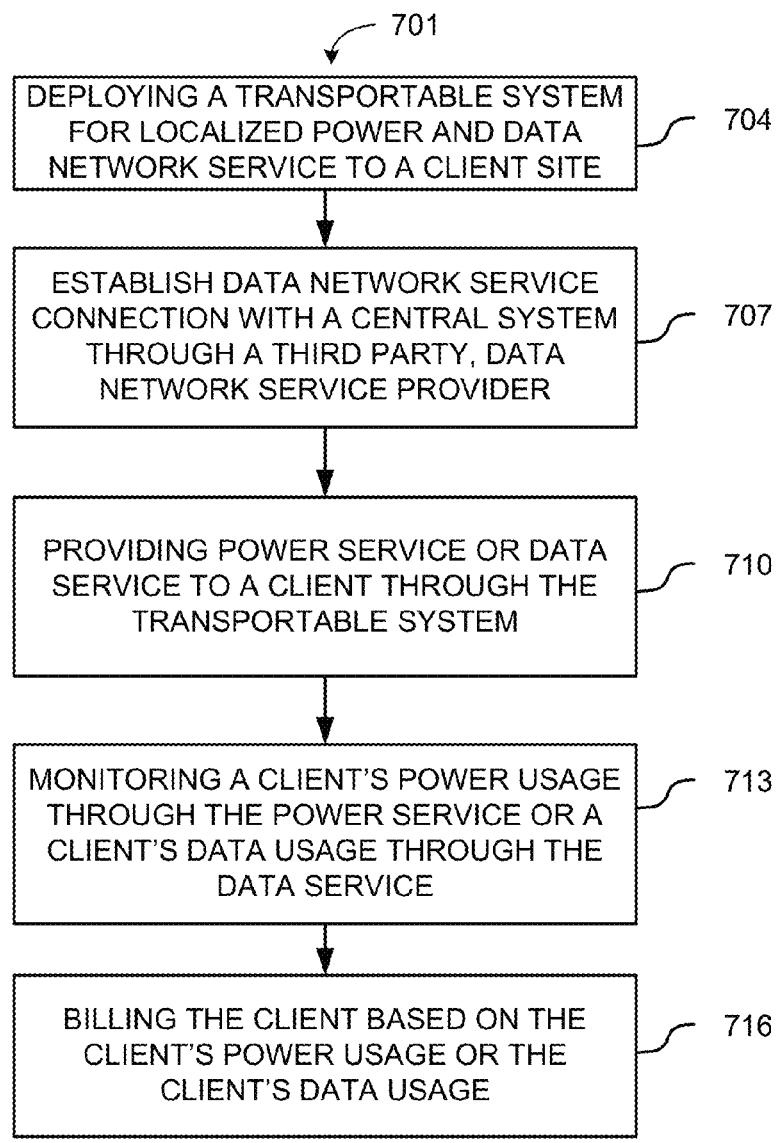
FIG. 7B is a flowchart illustrating an example of a method for operating a plurality of transportable power and data infrastructure systems as a utility company.

FIG. 7B is a flowchart illustrating an example of a method for operating a plurality of transportable power and data infrastructure systems as a utility company. In the example of FIG. 7B, the flowchart 701 begins at module 704 with deploying a transportable system for localized power and data network service at a client site (i.e., utility customer site). For example, the transportable system may be deployed adjacent to the client it will be servicing, or may be deployed at a location in close proximity to the client it will be servicing. In another example, the transportable system may be deployed at a location such the transportable system can service multiple clients concurrently (i.e., each client would have their own power or data service connection to the transportable system; in some embodiments, this would allow for accurate billing of services rendered to each client). As described herein, the deployment of the transportable system can utilize a deployment engine to deploy components of the transportable system. For example, a crane or lever arm of the deployment engine to deploy a solar panel or raise a mast of the transportable system.

In the example of FIG. 7B, the flowchart 701 continues to module 707 with establishing a data network service connection between the transportable system and a central system (e.g., 510 in FIG. 5B) through a third-party, data network service provider. As described herein, the central system may be operated by a third party functioning as a utility company. Such a company performs functions similar to those of a traditional utility company. Additionally, such a company may have sold, rented, or leased the transportable system to the client or clients they service. Once deployed, maintenance and service of the transportable systems may be performed by the third party, utility company or, alternatively, by another third party maintenance company. As also described herein, the data network service connection allows for remote monitoring or controlling of the transportable system by the operator of the central system (e.g., utility company).

In the example of FIG. 7B, the flowchart 701 continues to module 710 with providing power service, data service, or both through the deployed transportable system. As described herein, once a deployed transportable system begins providing power service or data service to a client, the usage of such services is monitored and accounted. As such, flowchart 701 continues to module 713 with monitoring a client's power usage through the power service, or a client's data usage through the data service.

In the example of FIG. 7B, the flowchart 701 continues to module 716 with billing the client based on the client's power usage or the client's data usage. As described herein, in some embodiments, a billing engine located at the transportable system can monitor the client's power usage or data usage, calculate the amount to bill the client based on such usage, and then transmit the billing information to the central system which bills the client. The central system may bill the client using a billing engine located at the central system.

In other embodiments, the transportable system (possibly through a billing engine located at the transportable system) can send the client's power usage information or data usage information to the central system for the central system to determine the amount to bill the client. The central system, in turn, can receive the power usage or data usage information and use it to calculate the amount to bill the client, and bill them accordingly. In some implementations, the central system uses a billing engine (e.g., 516) calculate and send a bill to the client.

Figure 8:
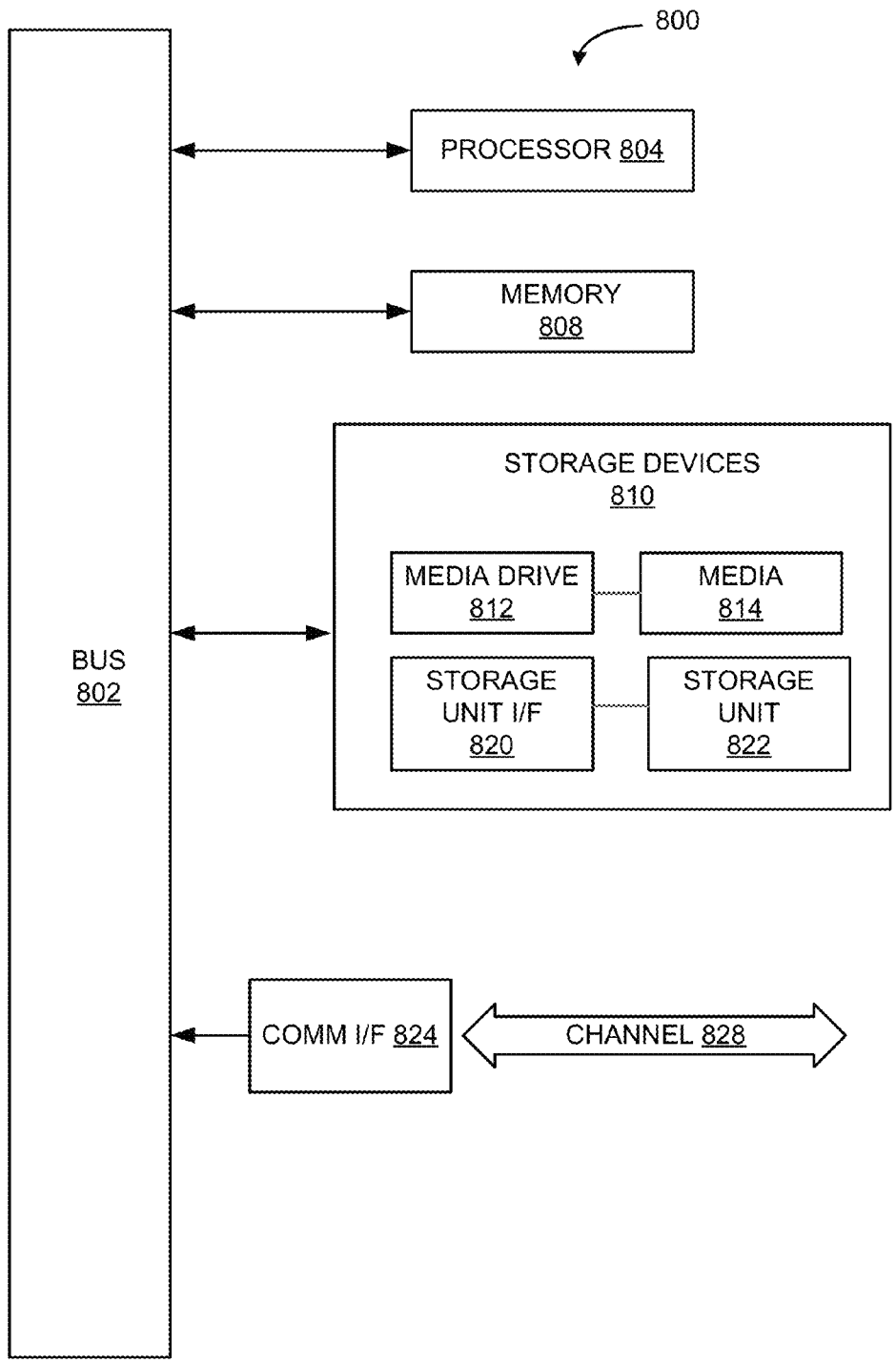
FIG. 8 is a diagram illustrating an example of a computer system suitable for use in an engine of a transportable power and data infrastructure system.

In additional embodiments, the transportable system may send power usage or data usage information as an internal operational condition of the transportable system through the transportable system's maintenance engine. Subsequently, the central system can store the power and data usage information received from the transportable system to local data servers (e.g., 519), from which a billing engine (e.g., 516) at the central system can retrieve such usage information and perform its billing functions.

Where components of the invention are implemented in whole or in part using software, in one embodiment, these software elements can be implemented to operate with a computing or processing engine capable of carrying out the functionality described with respect thereto. One such example computing engine is shown in FIG. 8. Various embodiments are described in terms of this example-computing engine 800. After reading this description, it will become apparent to a person skilled in the relevant art how to implement the invention using other computing engines or architectures.

Referring now to FIG. 8, computing engine 800 can represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing engine 800 might also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability.

Computing engine 800 might include, for example, one or more processors, controllers, control engines, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing engine 800 or to communicate externally.

Computing engine 800 might also include one or more memory engines, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing engine 800 might likewise include a read only memory ("ROM") or other static storage device coupled to bus 802 for storing static information and instructions for processor 804.

The computing engine 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing engine 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory engine) and memory slot, a PCMCIA slot and card, and other fixed or removable storage units 822 and interfaces 820 that allow software and data to be transferred from the storage unit 822 to computing engine 800.

Computing engine 800 might also include a communications interface 824. Communications interface 824 might be used to allow software and data to be transferred between computing engine 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media can be involved in carrying one or more sequences of one or more instructions to a processing device for execution. Such instructions embodied on the medium, are generally referred to as "computer program code" or a "computer program product" (which can be grouped in the form of computer programs or other groupings). When executed, such instructions might enable the computing engine 800 to perform features or functions of the present invention as discussed herein.

Various techniques have been described by way of example in this paper. The figures are intended to be useful for understanding the examples provided. A variety of alternative architectures and configurations may be applicable for any given example. Indeed, it will be apparent to one of skill in the art how alternative functional, logical or physical partitioning and configurations can be used to implement desired features. A multitude of different constituent engine names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment.

Terms and phrases used in this document, and variations thereof, unless otherwise expressly stated, should be construed as open ended. As examples of the foregoing: the term "including" should be read as meaning "including, without limitation" or the like; the term "example" is used to provide instances of a thing, not an exhaustive list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A transportable system for providing localized power infrastructure and data infrastructure, comprising:
   a data network service engine configured to function as a local data network service provider;
   a power generation engine configured to function as a local power service provider that generates and distributes power locally;
   a deployment engine configured to assist in deploying one or more components of the transportable system; and
   a maintenance engine configured to maintain operation and security of the transportable system by:
      monitoring an internal operational condition and an external operational environment of the transportable system,
      using data from the monitoring to determine whether the data network service engine is operating according to a first operational parameter and within a first damage risk threshold and the power generation engine is operating according to a second operational parameter and within a second damage risk threshold, and
      based on the determination, controlling the data network service engine, the power generation engine, or the deployment engine to ensure that the data network service engine continues to operate according to the first operational parameter and within the first damage risk threshold, and that the power generation engine continues to operate according to the second operational parameter and within the second damage risk threshold.

2. The transportable system of claim 1, wherein the deployment engine comprises a positioning engine configured to reposition the transportable system or a component of the transportable system when the maintenance engine determines from the external operational environment that a current position of the transportable system or the component exceeds the first damage risk threshold or the second damage risk threshold.

3. The transportable system of claim 1, wherein the deployment engine comprises a positioning engine configured to reposition the transportable system or a component of the transportable system when the maintenance engine determines that the transportable system or the component needs to track the sun in order for the power generation engine to operate according to the second operational parameter.

4. The transportable system of claim 1, wherein the deployment engine comprises a positioning engine configured to reposition the transportable system or a component of the transportable system when the maintenance engine determines that the transportable system or the component needs to track the wind in order for the power generation engine to operate according to the second operational parameter.

5. The transportable system of claim 1, wherein the deployment engine is configured to assist in repositioning a component from the transportable system to a location adjacent to the transportable system for deployment.

6. The transportable system of claim 1, wherein the data network service engine comprises a network interface adapted to connect the data network service engine to a third party wireless data network connection service through a wireless connection, or to a third party data network connection service through a wired connection.

7. The transportable system of claim 1, wherein the data network service engine comprises a network interface adapted to provide a local data network connection service through a wireless connection, or a local data network connection service through a wired connection.

8. The transportable system of claim 1, wherein the power generation engine comprises a generator, a solar panel, a wind turbine, a water turbine, a fuel cell, a fuel tank, or a battery, and wherein the power generation engine is configured to concurrently use a combination of power sources.

9. The transportable system of claim 1, wherein the maintenance engine is configured to detect intermittent power shortfalls on an external power grid operated by a third party power service provider, and control the power generation engine in order to compensate for the intermittent power shortfalls.

10. The transportable system of claim 1, wherein the power generation engine is configured to provide surplus power to an external power grid operated by a third party power service provider.

11. The transportable system of claim 1, wherein the maintenance engine is further configured to allow a systems operator to remotely monitor the internal operational condition and the external operational environment, and remotely operate and secure the transportable system or a component of the transportable system.

12. The transportable system of claim 1, wherein the maintenance engine comprises a camera, a sensor, a clearing device, a cooling device, a fire suppressant system, an insect or animal repellant, or lighting that assists in maintenance of the transportable system or a component of the transportable system.

13. The transportable system of claim 1, wherein the maintenance engine determines from the internal operational condition or the external operational environment that a current operation of the transportable system or a component of the transportable system exceeds the first damage risk threshold or the second damage risk threshold, and in response, alerts a systems operation of the excess.

14. The transportable system of claim 1, wherein the maintenance engine is further configured to detect, from the internal operational condition or the external operational environment, an error in the data network service engine, the power generation engine, or the deployment engine, and alert a systems operator of the error.

15. The transportable system of claim 1, wherein the transportable system is embedded in or configured to be transported by a motorized vehicle, a trailer, a train, or an aircraft.

16. The transportable system of claim 1, further comprising:
a first transportable module comprising the maintenance engine, the data network service engine, the power generation engine, and the deployment engine;
a second transportable module comprising a second maintenance engine, a second data network service engine, a second power generation engine, and a second deployment engine; and
an interconnect module that interconnects the first transportable module to the second transportable module;
wherein the first transportable module uses the second maintenance engine to augment or redundantly support the maintenance engine, the first transportable module uses the second data network service engine to augment or redundantly support the data network service engine, the first transportable module uses the second power generation engine to augment or redundantly support the power generation engine, or the first transportable module uses the second deployment engine to augment or redundantly support the deployment engine.

17. The transportable system of claim 1, further comprising a central maintenance engine configured to remotely monitor the internal operational condition and the external operational environment of the transportable system, or remotely control the transportable system.

18. The transportable system of claim 1, further comprising a billing engine configured to account for usage of power from the power generation engine or usage of data through the data network service engine.

19. The transportable system of claim 1, wherein the transportable system is one of a plurality of transportable systems monitored or controlled by a central system configured to monitor or control a plurality of transportable systems that provide localized power infrastructure and data infrastructure.

20. A transportable system for providing localized power infrastructure and data infrastructure, comprising:
a data network service engine configured to function as a local data network service provider;
a power generation engine configured to function as a local power service provider that generates and distributes power locally;
a maintenance engine configured to maintain operation and security of the transportable system; and
a deployment engine configured to assist in deploying one or more components of the transportable system, the deployment engine comprising a positioning engine configured to:
reposition the transportable system or a component of the transportable system when the maintenance engine determines from an external operational environment that a current position of the transportable system or the component exceeds a damage risk threshold; or
reposition the transportable system or the component of the transportable system when the maintenance engine determines that the transportable system or the component needs to track the sun or wind in order for the power generation engine to operate according to an operational parameter.

21. A method for providing localized power infrastructure and data infrastructure, comprising:
monitoring an internal operational condition and an external operational environment of a transportable system configured to provide localized power infrastructure and data infrastructure, wherein the transportable system comprises a data network service engine configured to function as a local data network service provider, and a power generation engine configured to function as a local power service provider that generates and distributes power locally;
using data from the monitoring to determine whether the data network service engine is operating according to a first operational parameter and within a first damage risk threshold and the power generation engine is operating according to a second operational parameter and within a second damage risk threshold; and
based on the determination, controlling the data network service engine or the power generation engine to ensure that the data network service engine continues to operate according to the first operational parameter and within the first damage risk threshold, and that the power generation engine continues to operate according to the second operational parameter and within the second damage risk threshold.

22. The method of claim 21, wherein the transportable system comprises:

a data network service engine configured to function as a local data network service provider;

a power generation engine configured to function as a local power service provider that generates and distributes power locally;

a deployment engine configured to assist in deploying the transportable system; and a maintenance engine configured to maintain operation and security of the transportable system by controlling the data network service engine, the power generation engine, or the deployment engine in order to perform the operations of the method.

23. A transportable system for providing localized power infrastructure, comprising:

a data network service engine configured to facilitate a data network connection with a third party data network service provider;

a power generation engine configured to function as a local power service provider that generates and distributes power locally; and a maintenance engine configured to maintain operation and security of the transportable system by:

monitoring an internal operational condition and an external operational environment of the transportable system, using data from the monitoring to determine whether the data network service engine and the power generation engine are operating according to an operational parameter and within a damage risk threshold, and based on the determination, controlling the data network service engine, or the power generation engine to ensure that the data network service engine and the power generation engine continue to operate according to the operational parameter and within the damage risk threshold.

24. The transportable system of claim 23, wherein the maintenance engine is further configured to transmit the internal operational condition or the external operational environment to a central system configured to remotely monitor a plurality of transportable systems, the transportable system being one of the plurality.

25. The transportable system of claim 23, wherein the maintenance engine is further configured to receive control instructions from a central system configured to remotely control a plurality of transportable systems, the transportable system being one of the plurality.

26. The transportable system of claim 23, further comprising a central maintenance engine configured to remotely monitor the internal operational condition and the external operational environment of the transportable system, or remotely control the transportable system.

27. The transportable system of claim 23, further comprising a billing engine configured to account for usage of power from the power generation engine.

28. The transportable system of claim 23, wherein the transportable system is one of a plurality of transportable systems monitored or controlled by a central system configured to monitor or control a plurality of transportable systems that provide localized power infrastructure.

29. A distributed utility system for providing localized power infrastructure, comprising:

a central system configured to monitor or control a plurality of transportable systems, wherein a transportable system of the plurality provides localized power infrastructure; and the plurality of transportable systems, wherein at least one of the plurality comprises:

a data network service engine configured to facilitate a data network connection with a third party data network service provider, a power generation engine configured to function as a local power service provider that generates and distributes power locally, and a maintenance engine configured to maintain operation and security of the transportable system by:

monitoring an internal operational condition and an external operational environment of the transportable system, using data from the monitoring to determine whether the data network service engine and the power generation engine are operating according to an operational parameter and within a damage risk threshold, and based on the determination, controlling the data network service engine, or the power generation engine to ensure that the data network service engine and the power generation engine continue to operate according to the operational parameter and within the damage risk threshold.

30. The utility system of claim 29, further comprising a central maintenance engine configured to remotely monitor the internal operational condition and the external operational environment of a transportable system of the plurality, or remotely control a transportable system of the plurality.

31. The utility system of claim 29, further comprising a billing engine configured to account for usage of power from the power generation engine.

32. A method for providing localized power infrastructure or data infrastructure, comprising:

deploying a transportable system to a client site, wherein the transportable system provides localized power infrastructure or data infrastructure to a client at or near the client site;

establishing a data network service connection between the deployed transportable system;

using the deployed transportable system to provide local power service or local data service to the client;

monitoring usage of the power service or the data service by the client, thereby resulting in usage information;

receiving the usage information from the transportable system over the data network service connection; and billing the client based on the usage information.

* * * * *